United States Patent [19]
Lichtman et al.

[11] Patent Number: 5,787,246
[45] Date of Patent: Jul. 28, 1998

[54] SYSTEM FOR CONFIGURING DEVICES FOR A COMPUTER SYSTEM

[75] Inventors: Moshe Lichtman, Bellevue; Mark R. Enstrom, Redmond; Thomas E. Lennon, Seattle; Ralph A. Lipe, Woodinville; Pierre-Yves Santerre, Bellevue; Robert T. Short, Kirkland; David W. Voth, Redmond, all of Wash.

[73] Assignee: Microsoft Corporation, Redmond, Wash.

[21] Appl. No.: 250,698

[22] Filed: May 27, 1994

[51] Int. Cl.$^6$ .................. G06F 15/02; G06F 12/02; G06F 9/445; G06F 15/40

[52] U.S. Cl. .............. 395/200.5; 395/828; 395/830; 395/200.56

[58] Field of Search .................. 395/600, 828, 395/830, 882, 500, 700, 200.56, 200.5

[56] References Cited

U.S. PATENT DOCUMENTS

| | | | |
|---|---|---|---|
| 4,268,901 | 5/1981 | Subrizi et al. | 364/200 |
| 4,317,183 | 2/1982 | Shimizu et al. | 364/900 |
| 4,562,535 | 12/1985 | Vincent et al. | 364/200 |
| 4,589,063 | 5/1986 | Shah et al. | 364/200 |
| 4,660,141 | 4/1987 | Ceccon et al. | 364/200 |
| 4,727,475 | 2/1988 | Kiremidjian | 364/200 |
| 4,730,251 | 3/1988 | Aakre et al. | 364/200 |
| 4,974,151 | 11/1990 | Advani et al. | 364/200 |
| 4,982,325 | 1/1991 | Tignor et al. | 364/200 |
| 5,038,294 | 8/1991 | Arakawa et al. | 364/491 |
| 5,109,484 | 4/1992 | Hughes et al. | 395/200 |
| 5,136,709 | 8/1992 | Shirakabe et al. | 395/700 |
| 5,157,384 | 10/1992 | Greanias et al. | 340/706 |
| 5,197,093 | 3/1993 | Knuth et al. | 379/61 |
| 5,247,682 | 9/1993 | Kondou et al. | 395/700 |
| 5,249,270 | 9/1993 | Stewart et al. | 395/200 |
| 5,252,951 | 10/1993 | Tannenbaum et al. | 345/156 |
| 5,257,368 | 10/1993 | Benson et al. | 395/600 |
| 5,257,379 | 10/1993 | Cwiakala et al. | 395/700 |
| 5,257,387 | 10/1993 | Richek et al. | 395/800 |
| 5,263,148 | 11/1993 | Jones, Jr. et al. | 395/500 |
| 5,289,372 | 2/1994 | Guthrie et al. | 364/403 |
| 5,297,262 | 3/1994 | Cox et al. | 395/325 |
| 5,319,790 | 6/1994 | Kumagai | 395/800 |
| 5,335,350 | 8/1994 | Feldenman et al. | 455/17 |
| 5,359,713 | 10/1994 | Moran et al. | 395/200 |
| 5,371,492 | 12/1994 | Lohrbach et al. | 340/825.03 |
| 5,379,431 | 1/1995 | Lemon et al. | 395/700 |
| 5,386,551 | 1/1995 | Chikira et al. | 395/575 |
| 5,386,567 | 1/1995 | Lien et al. | 395/700 |
| 5,408,618 | 4/1995 | Aho et al. | 395/325 |
| 5,412,798 | 5/1995 | Garney | 395/500 |
| 5,420,987 | 5/1995 | Reid et al. | 395/325 |
| 5,428,748 | 6/1995 | Davidson et al. | 395/275 |
| 5,450,570 | 9/1995 | Richek et al. | 395/500 |
| 5,452,454 | 9/1995 | Basu et al. | 395/700 |
| 5,454,078 | 9/1995 | Heimsoth et al. | 395/200.1 |
| 5,459,867 | 10/1995 | Adams et al. | 395/700 |
| 5,459,869 | 10/1995 | Spilo | 395/700 |

(List continued on next page.)

OTHER PUBLICATIONS

"CardWare™ User Manual 1.50A," released on Oct. 8, 1993 by Award Software International, Inc., pp. 1-33.

*Primary Examiner*—Thomas C. Lee
*Assistant Examiner*—Rehana Perveen
*Attorney, Agent, or Firm*—Jones & Askew, LLP

[57] ABSTRACT

A system for configuring devices of a computer system without user intervention. Device information for each of the devices is collected to uniquely identify the devices and to describe the device characteristics associated with the operation of devices with the computer. Computer resources, which support the functions of the devices within the computer, are allocated based upon the device information. This allocation process prevents a potential conflicting use of the resources by the devices. A device driver, which enables communications between the corresponding device and the computer system, is also identified for each of the devices in response to the device information. In response to the allocation of resources, the identified device drivers are loaded and the devices are activated for operation with the computer.

98 Claims, 11 Drawing Sheets

U.S. PATENT DOCUMENTS

| | | | |
|---|---|---|---|
| 5,469,545 | 11/1995 | Vanbuskirk et al. | 395/200.01 |
| 5,471,675 | 11/1995 | Zias | 395/162 |
| 5,485,460 | 1/1996 | Schrier et al. | 370/94.1 |
| 5,491,813 | 2/1996 | Bondy et al. | 395/500 |
| 5,517,636 | 5/1996 | DeHart et al. | 395/500 |
| 5,517,646 | 5/1996 | Piccirillo et al. | 395/700 |
| 5,542,055 | 7/1996 | Amini et al. | 395/281 |
| 5,553,281 | 9/1996 | Brown et al. | 395/600 |
| 5,581,261 | 12/1996 | Hickman et al. | 342/385 |

001
SYSTEM FOR CONFIGURING DEVICES FOR A COMPUTER SYSTEM

TECHNICAL FIELD

The present invention relates to data processing systems and, more particularly described, relates to configuring devices for operation with a computer system without user intervention.

BACKGROUND OF THE INVENTION

The process of installing a peripheral device or an add-on type adapter board for use with a personal computer system can be a relatively frustrating experience for the typical computer user. Nevertheless, a computer typically will not operate with a newly installed component until the user has completed a proper allocation of resources. Computer resources are allocated during a configuration process to permit the conflict-free use of the limited resources. To configure the computer, the user often must complete a relatively complex series of technical tasks. Thus, the difficulties faced by many users during the configuration process are emphasized by the absence of an automated process for resolving resource conflicts.

For many personal computer systems, neither the operating system nor the application programs running on the computer can determine which hardware components are connected to the computer. Likewise, the various hardware components connected to the computer system often fail to detect the occurrence of a conflict between different hardware devices that attempt to share the same resource. Accordingly, a user typically must resolve a resource conflict by first identifying the problem and thereafter experimenting with hardware and software configurations in an attempt to correct the resource conflict.

When attempting to tackle hardware and software integration issues, the user is exposed to technical concepts that can be somewhat confusing for those without technical training, such as computer architecture issues, including hardware interrupts, direct memory access (DMA) channels, memory addresses, and input/output (I/O) ports. Likewise, many common configuration tasks require the user to be familiar with the finer details of the computer's operating system, including system configuration files, such as Autoexec.Bat, Config.Sys, and *.Ini files. In view of these technical concepts, some users find the configuration process so intimidating that they refuse to consider upgrading a component of their personal computer or connecting a new peripheral device to add a new capability to their computer system.

Unlike today, early personal computers required minimum coordination between the computer hardware and software components. Users were presented with few difficult configuration issues after the initial installation of the computer system. A limited number of peripheral devices were commercially available for supplementing the processing functions of the personal computer. In addition, early personal computers were primarily used for dedicated tasks, such as word processing or calculating financial information with a spreadsheet program, at a fixed desktop location.

In contrast, present computers are often portable systems that can be regularly connected to different peripheral devices and external systems. There exists many more computer peripheral devices that require the use of resources during computer operation than the limited quantity of available resources. Furthermore, a user can harness the powerful computing operations of a present personal computer to complete numerous tasks outside the traditional realm of word processing and financial calculations, such as graphics, audio, and video. For example, numerous peripheral devices and add-on systems are now commercially available to enable the user to customize the functions and operating characteristics of a personal computer. Docking-type computer systems enable a user to operate a mobile computer at either a base station or in remote locations. Thus, the rapid acceptance of portable computing and the multi-faceted uses of the personal computer emphasize the need for supplying a "user friendly" system that configures new hardware or software devices for use with the computer system.

The Industry Standard Architecture (ISA) standard is a widely used bus architecture for personal computer systems. The ISA expansion bus, which is commonly associated with the IBM Personal Computer AT and other compatible computers, provides a 16-bit bus that supports the connection of adapter boards within the computer. The ISA bus structure requires allocation of resources, such as hardware interrupts, DMA channels, memory addresses, and I/O ports, among multiple ISA-compatible adapter boards connected to the ISA expansion bus. However, the ISA standard does not define a hardware or software mechanism for allocating those resources for use by the installed adapter boards. Consequently, configuration of the ISA adapter boards is typically completed by connecting jumper cables or changing switch settings on the boards to change the decode maps for memory and I/O ports and to direct the DMA channels and interrupt signals to various pins along the expansion bus. Furthermore, system configuration program files of the operating system may need to be updated to reflect any modifications to the resource allocation.

Alternative expansion bus standards, such as the Micro Channel Architecture (MCA) and the Extended Industry Standard Architecture (EISA) standards, have limited hardware and software mechanisms to identify resources requested by a peripheral device and to resolve resource conflicts. However, these mechanisms are not implemented by the computer's operating system and are not compatible with the large installed base of personal computers based on the ISA standard. Furthermore, computer systems implementing the MCA and EISA standards are generally more expensive than ISA-compatible computers and lack the variety of add-on adapter boards and peripheral devices available for use with ISA-compatible computers.

To address the issue of configuration management, the computer industry is at present offering full-featured computer systems having preconfigured hardware and preinstalled software, thereby eliminating the need for a user to conduct the installation and configuration tasks for the purchased computer system. However, this is a somewhat limited solution because vendors typically market a computer system having a standard configuration of hardware and software components. Thus, this approach defeats the flexibility offered by the ISA bus expansion structure because users cannot obtain a computer capable of performing a customized function through this standardized configuration approach.

To overcome the frustration of users with present complicated configuration processes, it would be desirable to provide a system for automatically configuring a peripheral device or adapter board for a computer system. A system is needed to enable a user to simply connect a device to the computer, turn on the computer, and have the device properly work with the computer. There is a further need for a system that determines the optimal configuration for its resources and enables application programs to fully utilize the available resources.

In recognition of the problems of prior configuration processes, the present invention provides a system that permits easy installation and configuration of devices which are capable of identifying themselves and declaring their services and resource requirements to the computer. The device identification and resource requirement information enable the system to determine and establish a working configuration for all devices connected to the computer, and to load the appropriate device drivers. In this manner, the present invention supports a variety of computer bus architectures and device classes. Accordingly, the present invention efficiently allocates system resources between the devices of the computer system without substantial user intervention.

SUMMARY OF THE INVENTION

The problems associated with the manual installation and configuration of adapter boards and peripheral devices for computer systems are solved by the principles of the present invention. The present invention provides a system for configuring the hardware and software components of a computer system by optimally allocating system resources for use by computer devices.

The present invention enables a user of a computer system to install a new device by connecting the device to the computer, powering the computer, and using the computer to take advantage of the function supplied by the new device. Likewise, the present invention permits a user to insert a mobile computer into a base station while both the mobile computer and the base station are powered and to reconfigure the mobile computer for operation with the devices connected to the base station. Thus, the present invention addresses the needs of computer users by supplying a computer-implemented process for configuring devices for a computer system and for accommodating seamless dynamic configuration changes of the computer system.

A system constructed in accordance with the present invention configures devices of a computer system by identifying the devices, determining the desired usage of the resources of the computer system, detecting and resolving potential conflicting uses of the resources, and allocating resources for use by the devices. An operating system runs on the computer system and supports these configuration tasks.

The computer system includes various resources, including interrupts, direct memory access (DMA) channels, memory addresses, and input/output (I/O) ports, at least one system bus, and devices. System busses are components that supply physical connections to devices. Each of the devices is connected to one of the system busses of the computer system.

The system busses can be compatible with a variety of bus architectures, including the Industry Standard Architecture (ISA), Micro Channel Architecture (MCA) and Extended Industry Standard Architecture (EISA) bus standards, as well as Personal Computer Memory Card International Association (PCMCIA), Small Computer Systems Interface (SCSI), Personal Computer Interface (PCI), Enhanced Capabilities Parallel (ECP), Vesa Local Bus (VL), Integrated Drive Electronics (IDE), and other bus standards. Typical devices supply the functions of system-level components, such as fixed and floppy disk controllers, display, keyboard, and mouse controllers, and serial and parallel controllers, and implement the functions offered by numerous add-on type adapter boards and peripheral devices.

Briefly described, the method for configuring the devices of the computer system is started by collecting device information for each of the devices of the computer system. This device information acquisition process permits the unique identification of the devices and the description of device characteristics associated with the operation of devices with the computer. A device driver, which enables communications between a corresponding device and the computer system, is thereafter identified for each of the devices in response to the device information. The resources, which support the functions of the devices within the computer, are allocated based upon the device information. This allocation process prevents any potential conflicting use of the resources by the devices. In response to resource allocation, the devices are configured and device drivers for the devices are loaded. The devices are thereafter activated for operation with the computer.

More particularly described, the present invention configures devices of a computer system based upon the collection of information about the devices and their connections to the system busses of the computer system. To collect the device information, a particular device is detected on the system bus of interest and thereafter assigned a device identification code that identifies the particular device as being connected to the selected system bus. At least a portion of the device identification code, specifically an identification code, uniquely identifies the detected device. Logical configuration data, which supplies configuration requirements for operating the particular device with the computer system, is also obtained for the detected device. This collection process is repeated until device information is eventually collected for each of the devices for all system busses of the computer system.

The device information is stored within computer system memory, such as volatile memory, to support the present configuration operation. At least a portion of the system memory is allocated for the storage of device information within a treelike structure of device nodes. Each device connected to the computer system is represented by a device node that stores associated device information. Furthermore, if an identified device represents a newly installed device for the computer system, then this device information also can be stored in nonvolatile computer memory, such as a fixed disk, to supply an archival source of such information for future configuration tasks. A computer database having a hierarchical data arrangement is typically used to store this archival device information.

The collection of device information, which is also described as enumeration, is initiated in response to dynamic events that cause an asynchronous change in the operating state of the computer system. These events typically affect the use of the resources by the devices of the computer system and include: powering the computer system; connecting another device to a system bus; removing a device from a system bus; and inserting the computer system into or removing the computer system from an expansion unit or a docking station.

The collection of device information supplies data that supports the identification of device drivers for the identified devices. A device driver can be obtained from one of several alternative sources of the computer system, including selected files of the operating system installed on the computer system, the device itself, a computer database maintained by the computer, or from the user via a disk containing the device driver. In general, the device driver for a device is often obtained by accessing a selected program file stored on either a fixed disk or another type of mass memory storage device of the computer system.

The computer database can contain device information associated with a particular device, including information for that particular device, which is also described as a primary device, and information for devices that are "compatible" with the primary device. For example, a first manufacturer's device may be compatible with a second manufacturer's device because both devices perform the same function and conform to an industry standard for operations. If the devices are compatible, a device driver for the first device often can be used to enable the operations of the second device and, likewise, a device driver for the second device can be used with the first device. Thus, a compatible device driver, if available, may be used to enable communications of the particular device with the computer system.

The stored device information for a particular device typically can be accessed by searching in the computer database for a location or a record that contains the identification code for the desired device. Thus, the identification code can be used as an entry key to search the records of the computer database. If the device information in a selected record describes the primary device, then the device driver intended for primary use with that device is maintained by the computer system and is available to support the device operations. Likewise, a compatible device driver is maintained by the computer system if compatible device information is stored within the selected record and associated with the particular device.

By convention, the primary device driver is typically selected to support the computer operations of the primary device over any of the device drivers for compatible devices. However, if the device driver for the primary device is not available, then a device driver for a compatible device is selected. In this event, if the compatible device information lists more than one device that is compatible with the particular device, then the compatible device having the highest priority or ranking is selected and used to support the operations of the particular device.

If neither the primary device driver nor a compatible device driver is available on the computer system, then the user can be requested to supply a substitute device driver that supports the operation of the device with the computer system. This request is typically supplied as a textual statement displayed on a display or monitor for the computer system or as an audio prompt generated by the computer system. In response to the request, the user can insert within the proper computer drive a flexible disk or other appropriate electronic media containing the device driver, thereby permitting the computer to access the device driver. The device driver then can be stored within an appropriate mass memory storage device and used to enable the communications between the particular device and the computer.

Resources, which typically include a finite set of resource elements, are allocated by first analyzing the device information to detect whether the devices require a potential conflicting use of resource elements for operation of the devices with the computer system. The desired resource element is assigned for use by a device if this resource assignment does not conflict with the use of that particular resource by another device. A resource element is available for use by a device if this element is neither reserved nor assigned for use by another device. Some resource elements are typically reserved for use by selected devices to insure the compatibility of the present invention with existing devices. Thus, if at least two of the devices require use of an identical resource element, then this potential resource conflict is arbitrated and resolved in an iterative manner based upon the device information and the finite resources of the computer. The resources are then assigned for use by the devices based upon this conflict-free solution.

In response to allocating the assigned resources to the devices, the devices are configured for operation with the computer system. Each device driver is loaded for use by the corresponding devices and the devices are activated for operation with the computer.

Focusing upon another aspect of the present invention, a system is provided for supporting the bus-specific operations of devices connected to a system bus of a computer system. This system, which is alternatively referred to as an enumerator or a bus driver, is assigned to operate with a specific system bus and is programmed to recognize the operating parameters of the assigned bus. Each system bus typically requires a unique configuration process that is based upon the architecture of the bus. The enumerator, which can be part of an operating system, directly supports the configuration of devices on its assigned bus by accessing device information for those devices and storing this data with a central memory. This enables an operating system for the computer system to be independent of the characteristics of a computer bus architecture because bus-specific information is handled by an abstraction layer, in this case, the enumerator.

The enumerator can perform three primary operations, specifically (1) detecting dynamic events causing an asynchronous change in the operating state of the computer system; (2) enumerating each of the devices connected to the assigned system bus in response to the detection of a dynamic event; and (3) supplying assigned resources to each of the devices in response to an allocation of resources. To implement these operations, the enumerator can include one or more elements that are responsible for those functions, namely an enumerate element, a configure element, and an event detect element. These functions are typically defined by the characteristics of its assigned system bus.

The enumerate element includes a detection module for detecting a particular device on the system bus and a collection module for retrieving device information from the particular device. The collection module obtains device information from the detected device and stores this data within device nodes of the computer memory to maintain an up-to-date inventory of the devices on the assigned system bus. Thus, the detection and collection modules operate in tandem to enumerate these devices. The computer memory can be a hierarchical database structure formed by a tree-like structure containing the device nodes, which represent each of the detected devices.

The configure element can include a receive module for receiving the allocation of assigned resource elements, an assigned resource storage module for storing the assigned resources within the device nodes of the computer memory, and a transmit module for supplying instructions about the assigned resources to the appropriate devices. In response to the assigned resources, the configure element accesses the device nodes in the computer memory and stores the appropriate resource element assignments.

The event detect element typically can detect the installation of a new device on the assigned system bus or the removal of an existing device. For example, device installation or removal can be detected by intercepting a particular interrupt signal or by periodically polling all of the available sockets of the bus to determine the installed devices. Likewise, the event detect element can detect the insertion of a computer system into or the removal of a computer system from a docking station. The event detect element is further responsive to booting the computer or the power state for the computer. In response to one of these events, the event detect element can supply the event detection information to the enumerate element, thereby initiating the enumeration process. The event detect element also can be responsive to certain query-type instruction signals containing commands for actions by the enumerator. These commands typically include: delete device information in a designated device node because the associated device has been removed from the computer, stop a present operation, and start a new operation.

Turning now to the enumeration process, a method is provided for identifying devices connected to a system bus of a computer system having resources. First, a particular device is detected on the system bus. For example, for the widely used ISA bus, devices are detected by instructing each of the devices to enter an inactive state, thereby disabling the function of the device. The detected device on the ISA bus is then isolated from the remaining devices to enable interference-free communication with the detected device. In contrast, for the PCMCIA bus, a particular device is detected by selecting the socket supplying the connection for that device. Thus, it can be seen that device detection is a bus-dependent operation and may vary among different bus architectures.

A device identification code is thereafter assigned to the detected device. The device identification code, which includes an identification code and a system bus code appended to the identification code, typically identifies this device as a certain device type that is connected to the system bus. The identification code typically contains a string of characters, such as American Standard Code for Information Interchange (ASCII) characters, which uniquely define the particular device. The identification code is useful for defining both the manufacturer of the associated component and the type of device, and for distinguishing between identical types of devices connected to the same system bus. The system bus code uniquely identifies the system bus associated with the connected device.

Logical configuration data is also obtained for the particular device to acquire the configuration requirements for operating the particular device with the computer system. The resources of a computer system generally offer a range of options or elements for using the resources. The logical configuration data includes resource requirement information that defines certain resources of the computer system which are necessary for proper operation of the particular device with the computer system. For example, resource requirement information for a modem may define a resource requirement for an interrupt within the range of interrupts 7–12. The logical configuration data also includes resource dependency information, which defines a particular combination of resource elements that are necessary for device operation. For a modem, typical resource dependency information may define the combination of interrupt IRQ4 with I/O3F8 (COM PORT 2).

The above-described steps of the identification process are repeated for each of the remaining devices connected to the system bus to permit the collection of device information from all connected devices. In the event that a device itself is implemented as a system bus, it may be necessary to identify device drivers, allocate resources, and load the identified device drivers prior to identifying any devices connected to this new system bus. For example, these tasks are typically completed prior to identifying a device connected to the PCMCIA bus which, in turn, is connected to an integrated expansion bus of the computer's system board, such as an ISA bus.

To assign the device identification code, the identification code can be accessed by reading the identification code from a memory storage device, such as read only memory (ROM) or a register, which is typically mounted on the interface board for the device. The system bus code is subsequently added to the identification code to complete the formation of the device identification code. The device identification code is thereafter typically stored within computer memory to support the configuration process.

Similarly, the logical configuration data can be retrieved from the particular device by reading the logical configuration data from the memory storage device for that device. The logical configuration data is thereafter stored within the computer memory and is associated with the device identification code for the particular device. In the event that the logical configuration data is not available from the particular device, at least a portion of the logical configuration data often can be retrieved from a selected file of the computer operating system, such as a configuration file, e.g., an .INF file.

The resource allocation process is supported by arbitrators that operate to determine the assignment of resource elements to the devices of the computer. An arbitrator is assigned to each resource of the computer system and is responsive to the resource requirement information and resource dependency information related to its resource to produce a conflict-free allocation of the resource elements. The arbitrator for a selected resource is programmed to recognize the characteristics of its resource. For example, the arbitrator for a interrupt resource of a conventional personal computer recognizes that this resource includes 16 interrupt elements.

An arbitrator includes an analysis element that is responsive to a possible configuration which defines the set of resource elements that are appropriate for operating the devices with the computer system. In response, the analysis element determines whether a particular resource element for a selected device is available for use by the selected device. The arbitrator also includes an assignment element for assigning the particular resource element for use by the selected device in response to determining that the particular resource element is available for use by the selected device.

Focusing upon yet another aspect of the present invention, a method is provided for obtaining a device driver to enable a device to communicate with a computer system. The computer system includes a database containing a set of records. Each record contains both a device identification field for storing the identification code of a primary device and a compatible device identification field for storing identification codes for compatible devices and at least one type of compatible device-related data.

Reviewing the data structure for a database record, the device identification field permits the recording of an identification code that identifies a primary device for operation with the computer. Likewise, the compatible device identification field permits the recording of both an identification code that identifies the primary device and identification codes that identify compatible devices. If the compatible device identification field contains an entry for the primary device, then a device driver specifically intended to support the computer operations of that primary device is available on the computer system. Likewise, compatible device drivers are available to support computer operations for both the primary device and other associated compatible devices if the compatible device identification field contains identification codes for compatible devices.

As an option, the compatible device identification field also permits the recording of priority data to permit a further distinction between the devices represented by the compatible device identification codes. The priority data supports the selection for a device driver of one of the compatible devices over another compatible device driver based upon the assigned rankings of the compatible devices. For example, the priority data can include a preferred use ranking or priority assigned by the vendors for the compatible devices. The compatible device having the highest priority ranking is typically selected for installation.

To obtain the device driver for a certain primary device, the computer database is searched to locate a selected record which is associated with that device. The identification code for this device is used as the entry key for the database because it identifies the desired device. Upon locating the selected record, the compatible device identification field is reviewed to determine if this field contains the identification code for the certain primary device.

If the identification code for the certain primary device is located within the compatible device identification field of the selected record, then the corresponding primary device driver is selected for use with the computer system. Upon identifying the proper device driver, the task of retrieving the desired device driver from its storage location is controlled by the operating system in a conventional manner. The identified primary device driver often can be retrieved from the mass memory storage device of the computer system.

However, in the event that the compatible device identification field does not contain the identification code for this primary device, then this field is examined to determine if it contains one or more of the identification codes for compatible devices. If so, then the compatible device having the highest priority is selected and the corresponding device driver is retrieved from the computer system.

In the event that the compatible device identification field does not contain an identification code for a compatible device, then the computer system supplies to the user an indication of the absence of the necessary driver for associated device. This indication can be a text-based or a combined text/graphics message, which is displayed by the computer monitor or supplied to a printer, or an audio prompt or statement.

In furtherance of these principles, it is an object of the present invention to provide a system for configuring devices of a computer system.

It is a further object of the present invention to provide a system for configuring a new device connected to a computer system.

It is a further object of the present invention to provide a system for identifying the devices connected to a computer system.

It is a further object of the present invention to provide a system that identifies the resource usage and system resource options for a device by obtaining such information from the device.

It is a further object of the present invention to provide a system that optimally allocates resources for use by the devices of the computer system.

It is a further object of the present invention to provide a system that identifies the devices of the computer system, determines a working configuration for the devices, and loads the appropriate device drivers.

It is a further object of the present invention to provide a system that accommodates seamless dynamic configuration of resources by enabling the configuration of devices in response to docking a mobile computer to a base station, removing the mobile computer from the base station, adding a new device to a computer, or removing a device from the computer.

It is a further object of the present invention to supply remote and local access to information directed to the present configuration of the computer system and the types of devices connected to the computer system.

That the present invention accomplishes these objects and offers the above-described advantages will be apparent to those skilled in the art from the following description, the appended claims, and the accompanying drawings.

DETAILED DESCRIPTION

To overcome the frustration of users with the present complicated and technical configuration processes for personal computers, the present invention provides a system for automatically configuring a peripheral device or an add-on type adapter board for use with a base or mobile computer system. The present invention enables a user to simply connect a new device to the computer, power the computer, and have the device properly work with the computer without user intervention. To provide this capability, the present invention determines the optimal configuration for the resources and enables the devices and the application programs to fully utilize the available resources. This can be accomplished for numerous computer bus architectures and types of devices.

The detailed description which follows is presented largely in terms of algorithms and symbolic representations of operations by conventional computer components, including a processor and memory storage devices. These algorithmic descriptions and symbolic representations are the means used by those skilled in the art to most effectively convey the substance of their work to others skilled in the art.

An algorithm is generally conceived to be a selfconsistent sequence of steps leading to a desired result. These steps generally require physical manipulations of physical quantities. Usually, though not necessarily, these quantities take the form of electrical or magnetic signals capable of being stored, transferred, combined, compared, or otherwise manipulated. It is convenient to refer to these signals as bits, values, elements, symbols, characters, terms, numbers, records, files or the like. It will be appreciated that all of these terms, as well as similar terms, are associated with appropriate physical quantities and are merely convenient labels applied to these quantities.

Automated Configuration System

Figure 1:
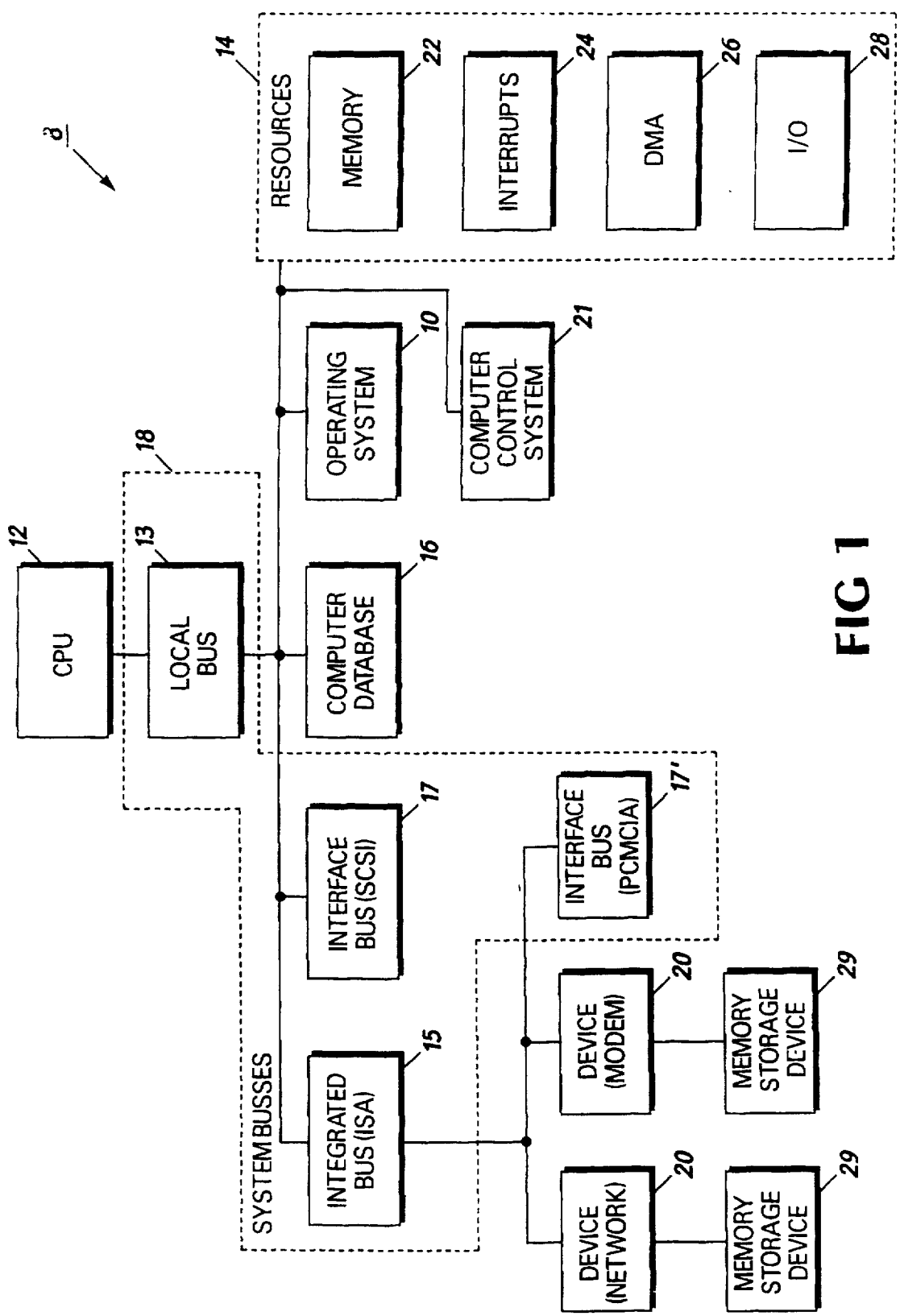
FIG. 1 is an overall block diagram of a computer system in which the preferred embodiment of the present invention is operative.

FIG. 1 shows a block diagram of the preferred operating environment, a computer system 8, for the preferred embodiment of the present invention. The present invention is based upon computer-implemented processes that can be embodied in one or more computer programs for a data processing system, such as the computer 8, to carry out the methods and functions described herein. This computer-implemented process operates upon electrical or other physical signals to generate the desired physical results. Referring now to FIG. 1, the computer system 8 runs an operating system 10 that operates with a central processing unit (CPU) 12, resources 14, system busses 18, devices 20, and a computer control system 21. The resources 14 include memory addresses for a memory 22, interrupts 24, direct memory access (DMA) channels 26, and input/output (I/O) ports 28. The system busses 18 typically include a local bus 13, an integrated bus 15, such as a system-level expansion bus, and at least one interface bus 17. The computer 8 represents a typical configuration for a conventional personal computer and it will be understood that the present invention is not limited to operations with the disclosed configuration for the computer 8.

The operating system 10 comprises a set of computer programs that control the internal functions of the computer system 8, thereby allowing the computer 8 to run application software (not shown). For the preferred embodiment, the operating system 10 is a graphic-based operating system, such as the "WINDOWS" operating system available from the assignee for this application, Microsoft Corporation, Redmond, Wash. The operating system 10 is preferably installed on a mass memory storage device, such as a fixed disk drive, of the computer 8. During computer operations, the operating system 10 is also allocated a portion of the memory 22 to support operations with the other components of the computer system 8.

The CPU 12 is typically implemented as a microprocessor, such as the models 80386 or 80486 that are available from Intel Corporation, Santa Clara, Calif. The CPU 12 operates in combination with computer software, such as the operating system 10 and application programs, to control the operations of the computer 8. One or more of the system busses 18 support communications of control, address, and data signals between the CPU 12 and the remaining components of the computer 8.

The resources 14 represent the resources of a conventional personal computer, such as the computer 8. The memory 22 is typically implemented by dynamic or volatile memory modules, such as random access memory (RAM), and static or nonvolatile memory modules, such as read only memory (ROM) units. The memory 22 preferably includes a conventional memory, which is the first 1024 kilobytes of dynamic memory in a personal computer, and an extended memory that extends above the 1024 kilobytes range. The interrupts 24, also referred to as the interrupt request lines, are signal paths within the computer 8 that carry signals informing the recipient that the sender is ready to transmit or to receive data. The DMA channels 26 enable the devices 20 or a computer program running on the computer 8 to access the memory 22 without involvement by the CPU 12, thereby supporting relatively fast data transfers. The I/O ports 28 represent ports used by the devices 20, such as peripheral devices or adapter boards, to communicate with the CPU 12.

The computer database 16 provides a central location for storage of archival information that supports the configuration of the devices 20. Specifically, the computer database 16 stores general system hardware and software parameters, as will be described in more detail below with respect to FIG. 8. The computer database 16 is preferably implemented by nonvolatile memory, such as a fixed disk or another type of mass storage memory device.

Each system bus 18 can be viewed as a "parent" capable of having "children" because a system bus provides a mechanism for connecting devices 20 to the computer 8. The system busses 18 typically supply the signal paths for the exchange of data, control signals, and addressing information among the components of the computer 8 and peripheral components, including the devices 20. The system busses 18 can be implemented as various bus architectures, such as the Industry Standard Architecture (ISA), Micro Channel Architecture (MCA), and Extended Industry Standard Architecture (EISA) standards, as well as Personal Computer Memory Card International Association (PCMCIA), Small Computer Systems Interface (SCSI), Personal Computer Interface (PCI), Enhanced Capabilities Parallel (ECP), Vesa Local Bus (VL), Integrated Drive Electronics (IDE), and other bus standards. The system busses 18 also can include local or personal computer (PC) busses, serial busses, and parallel busses. However, it will be understood that the present invention is not limited to operation with the above-described busses and that these busses are listed as representative of existing bus architectures.

The system busses 18 include the local bus 13, the integrated bus 15, and a pair of interface busses 17 and 17'. The integrated bus 15 is preferably an integrated or "fixed" expansion-type bus that enables the direct connection of peripheral devices or adapter boards to the computer 8. In contrast, the interface busses 17 and 17' are typically supplied by vendors as separate accessory or optional components that can be attached to the computer 8 via the local bus 13 or the integrated bus 15. Nevertheless, both the interface busses 17 and 17' permit the connection of additional devices to the computer 8.

For the representative computing environment shown in FIG. 1, the integrated bus 15 is implemented as an ISA bus and is connected to the local bus 13 on the system board of the computer 8. In addition, the interface busses 17 and 17' are respectively implemented as a SCSI bus and a PCMCIA bus. In particular, the SCSI bus is connected to the local bus 13 and the PCMCIA bus is connected to the integrated bus 15.

The devices 20, which are connected to the system busses 18, represent the logical functions of components that can be connected to a personal computer. The devices 20 include components typically located on or connected to a system board of a personal computer, including system-level devices, such as I/O controllers (fixed and flexible disk controllers), keyboard controller, serial and parallel controllers, system timer, display controller, programmable interrupt controller (PIC), and DMA controller. The devices 20 further include the functional devices for peripheral adapter boards and interface boards. Thus, for the representative computing environment shown in FIG. 1, the devices 20 include system-level devices (not shown), a modem card, and a network card.

A device 20 also can be implemented as a system bus 18 that is connected to another system bus. For example, in the computer 8, the PCMCIA bus is connected to the ISA bus and is capable of supplying a connection to the computer 8 for other devices. Thus, the PCMCIA bus represents both a system bus 18 and a device 20 within the computer 8. Likewise, both the ISA bus and the SCSI bus may be viewed as a system bus 18 and a device 20. Following the earlier analogy to "parent" and "child" components, it will be appreciated that a system bus 18 may be both a "parent" and a "child" within the preferred operating environment of the computer 8.

Although each of the devices 20 are shown in FIG. 1 as separate physical components, it will be understood that a computer component can contain more than one function and, accordingly, that component can contain more than one of the devices 20. Thus, it will be useful to consider the device 20 as a logical device rather than as a physical device. It will be understood that the devices 20 supply the building blocks that are required to harness the computing power offered by the CPU 12 and the resources 14.

With the exception of system-level devices, which are typically supplied as part of the system board of the computer 8, a device 20 can be connected to a memory storage device 29, such as a ROM or a register, for storing information about the associated device 20. The memory storage device 29 is useful for storing device-related information that supports the configuration of the devices within the computer 8. This device information typically includes a string of characters for uniquely identifying a corresponding device and resource usage data. For devices on adapter boards, the memory storage device 29 is preferably mounted on the board itself.

The inventors believe that the actual implementation of the memory storage device 29 can be any type of circuit or component that allows the device information to be accessed to support configuration operations. Typical data storage components include ROMs, registers, and other conventional memory components. Furthermore, the device-related information also can be "stored" by constructing circuitry that represents a "hard-wired" version of such information. Device information can be stored in a device-dependent fashion. Accordingly, it will be understood that the memory storage device 29 is not limited to the above-described implementations.

The computer control system 21 conducts initialization and test functions, as well as device configuration functions, when the computer 8 is first powered or "booted." Upon booting the computer 8, one or more start-up programs begin to run to implement necessary initialization and test functions. These start-up programs may be implemented as stand-alone programs or are integrated to function within the framework of the operating system 10.

The start-up programs typically include a basic input/output system (BIOS) program and a power-on self-test (POST) program. The BIOS program supplies device-level control or support services for the primary input/output devices of the computer during the boot "initialization" process. Furthermore, after boot, the BIOS program accepts requests from application programs or the operating system running on the computer and performs input/output services as requested by those programs. The POST program conducts a sequence of tests for certain system-level devices and resources, including memory, to verify the proper operation of the computer components that are required to be active upon completion of the boot process. The programs associated with the computer control system 21 are preferably stored in ROM located within the computer 8, typically on the computer motherboard. The functions and operations of conventional BIOS and POST programs are well known and will not be further described herein. However, as described in more detail below, the computer control system 21 preferably includes a modified BIOS program that is further capable of (1) configuring the boot-level devices of the computer 8 and, if required, (2) detecting the insertion or removal of the computer 8 from a docking station or an expansion system. This modified BIOS program can be viewed as a type of system bus because it supplies connections to the system-level devices on the motherboard to support the configuration of such devices.

When viewed collectively, the CPU 12, the resources 14, a fixed disk including the computer database 16, the system busses 18, and the devices 20 represent the hardware components for a typical personal computer as embodied by the computer 8. The devices 20, which are connected to system busses 18 that are organized in a hierarchical manner, perform their respective functions by operating with the resources 14. Nevertheless, with the exception of certain types of the peripheral devices or adapter boards, the typical user is rarely exposed to the technical aspects of computer operations. In view of the relative technical complexity of the typical personal computer, it will be appreciated that there is a need for a system for configuring the devices of a personal computer without substantial support by the user. The inventors' solution for this problem is a system that permits a user to simply connect or attach a desired device to a computer, power-on the computer, and thereafter use the function associated with the device. This configuration system is supported by the hardware components of its computing environment and the computer-implemented processes of the operating system 10 and the computer control system 21.

Figure 2:
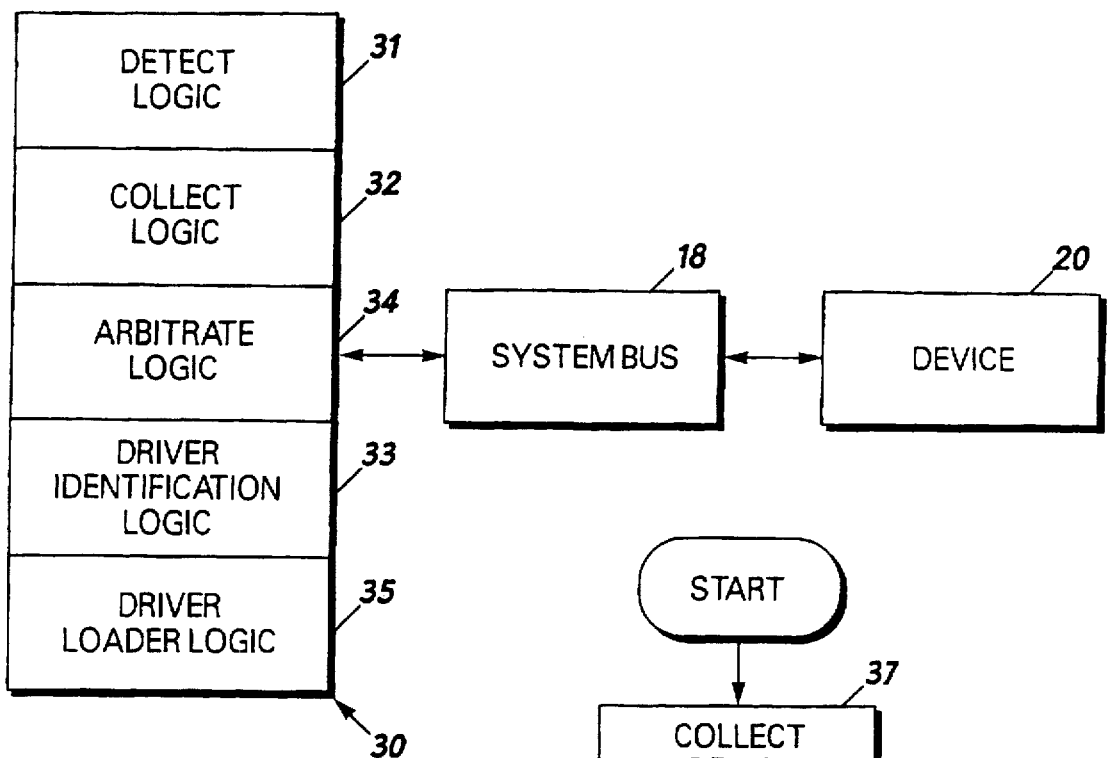
FIG. 2 is a block diagram that illustrates the preferred embodiment of the present invention.

FIG. 2 is a block diagram that illustrates the basic building blocks for the preferred embodiment of the configuration system. Referring now to FIGS. 1 and 2, the configuration system is useful for configuring the computer system 8 to insure that the devices 20 have conflict-free access to the resources 14. Configuration logic 30, which can be implemented as a portion of the operating system 10, controls the configuration tasks. Specifically, the configuration logic 30 is supported by the operating system 10, the computer control system 21, and the processing and storage functions offered by the computer 8.

In response to an event causing an asynchronous change in the operating state of the computer system 8, the configuration logic 30 operates to collect device information from each of the devices 20. For devices that have been designed to support the preferred operating system, this device information can be accessed by reading at least a portion of the data from a data storage mechanism associated with the device 20, such as the memory storage device 29. The configuration logic 30 thereafter allocates the resources 14 for the devices 20 in response to the collected device information. This prevents a conflicting use of the resources 14 by the devices 20 within the computer system 8.

To collect device information from a selected device 20 on one of the system busses 18, the configuration logic 30 includes a detection module 31 for detecting a selected device on that bus and a collection module 32 for collecting device information from the detected device. Each system bus 18 in the computer 8 is preferably represented by a combination formed by a detection module 31 and a collection module 32. This combination defines the enumeration function of a component of the operating system 10 that will be described in more detail below with respect to FIG. 6, specifically an enumerator.

A driver identification module 33 responds to the device information by identifying a device driver for each of the devices 20 that supplied device information to the collection module 32. The collected device information is then analyzed by an arbitration module 34 to determine whether the selected device requires a potential conflicting use of the resources 14.

The arbitration module 34 assigns elements of the resources 14 by searching for available resource elements. As required, the arbitration module 34 resolves any potential conflicting use of an element of the resources 14 to enable the conflict-free allocation of a resource element to the selected device 20. Each resource 14 can be represented by a self-contained component of the arbitration module 34 to permit the efficient addition of arbitration capabilities for new resources. A driver loading module 35 thereafter loads the identified device drivers for use by the devices 20 in response to the allocation of the necessary elements of the resources 14.

Figure 3:
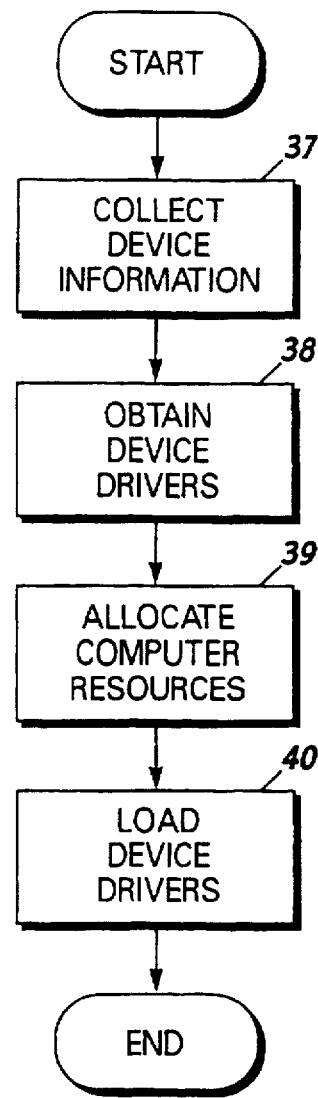
FIG. 3 is a flow chart diagram that illustrates the steps of a method for configuring the devices of a computer system.

FIG. 3 generally shows the steps for a method for configuring the devices 20 for operation with the computer system 8. Turning now to FIGS. 1 and 3, the computer-implemented process is started and device information is collected at step 37 for each of the devices 20. For each device 20, the device information includes identity data for uniquely identifying the corresponding device and resource allocation data for defining the resource requirements of the particular device. This device information is preferably associated with or otherwise linked with information for the corresponding system bus 18. The resulting product of this data collection process can be viewed as an inventory of the devices 20 connected to the system bus 18 of the computer 8.

For the devices that are designed to take advantage of the present inventive concept, at least a portion of the device information can be acquired by accessing the memory storage device 29. However, certain system-level components and existing "legacy" boards containing devices 20 may not include a memory storage device 29 for storing such device-level information. In this event, the device-level information is preferably acquired from other sources, such as the BIOS program of the computer control system 21 or configuration files of the operating system 10. For the legacy devices, certain device-level information can also be acquired by examining the signature-like responses output by these devices in response to command signals supplied to the I/O ports 28.

A device driver is thereafter obtained at step 38 for each of the devices 20 in response to the device information. At step 39, the resources 14, which are used by the devices 20 during computing operations, are allocated based upon the device information. Resource allocation is preferably an iterative routine that attempts to identify and resolve potential resource conflicts prior to an actual conflicting use of the resources 14 by the devices 20 during operation of the computer 8. In response to this allocation of the resources 14, the device driver for each of the devices is loaded at step 40 and the devices 20 are subsequently activated for operation with the computer 8, thereby terminating this configuration process.

Device information is preferably acquired for each of the devices 20, including all devices 20 supported by peripheral devices, add-on type adapter boards, system-level devices, and certain system busses. However, in the event that one of the devices 20 itself is implemented as a system bus, it may be necessary to complete the configuration tasks for the identified devices 20 connected to the system bus 18 prior to detecting any devices on the newly identified system bus. These tasks include identifying device drivers, allocating resources, and loading identified device drivers for the remaining devices 20 on the first system bus prior to identifying any of the devices connected to this newly identified second system bus.

For the computer 8, the steps shown in FIG. 3 are preferably first conducted for the devices 20 on the integrated bus 15 and thereafter repeated to permit the identification of the additional devices connected to the interface bus 17'. This enables the devices 20 connected to the "parent" component represented by the ISA bus to be configured prior to the devices 20 on the "child" component of the PCMCIA bus. It will be understood that this type of configuration sequence is defined by the connection of second system bus (the PCMCIA bus) to a first system bus (the ISA bus).

In this manner, the devices 20 of the computer 8 are identified and associated with each of the system busses 18. In addition, the resources 14 are efficiently allocated based upon the device information, and the device drivers are assigned and loaded to enable the operations of the devices 20 with the computer 8. It will be understood that the proper configuration of the computer 8 is necessary for the devices 20 to use the resources 14 of the computer 8 and to communicate with the application programs (not shown) running on the computer 8. Accordingly, the computer 8 is typically configured prior to using the devices 20 for the desired computing functions.

Although it is desirable to configure all of the devices 20 during the power-up or boot processes, particularly prior to completing the test and initialization routines of the computer control system 21, many resource conflicts cannot be fully resolved without complete knowledge of all resource requirements for the devices 20. Nevertheless, the preferred system supports the configuration process during the computer start-up sequence for a limited set of the devices 20, specifically those boot-level devices that are required to "come-up" active during the boot process. Thus, this pre-boot configuration process is completed for the "fixed" system-level devices on the computer's system board, which is also described as a motherboard. Likewise, the pre-boot configuration process is completed for the set of devices 20 that are connected to integrated expansion board, specifically the integrated bus 15, and are required for boot-level operations. The remaining devices 20, which also may require resource allocation, are preferably configured only after the computer 8 has completed the boot process.

Figure 4A:
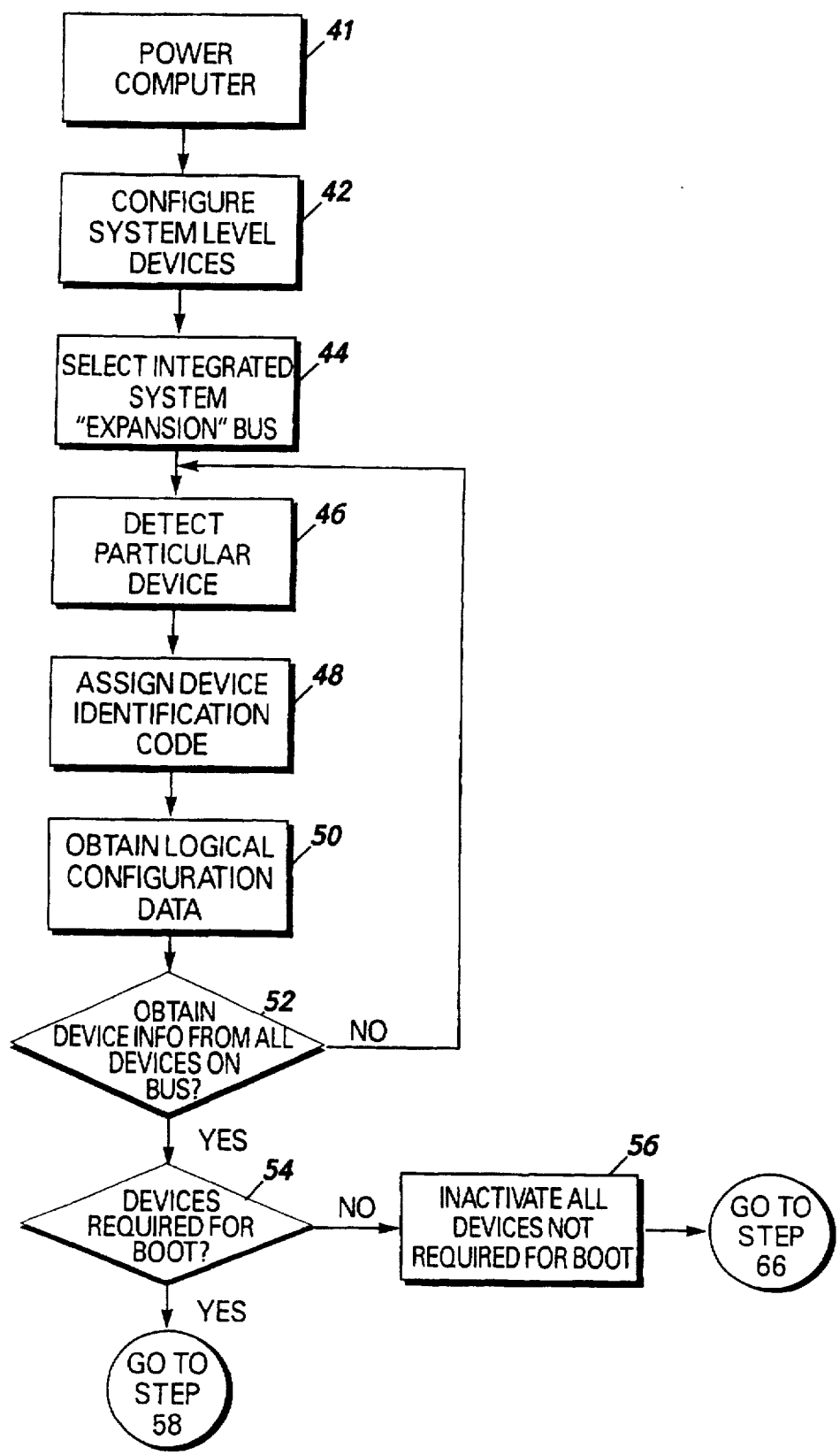
FIGS. 4A–C are flow chart diagrams that illustrate the preferred steps of a method for configuring the devices of a computer system in accordance with the preferred embodiment of the present invention.
Figure 4B:
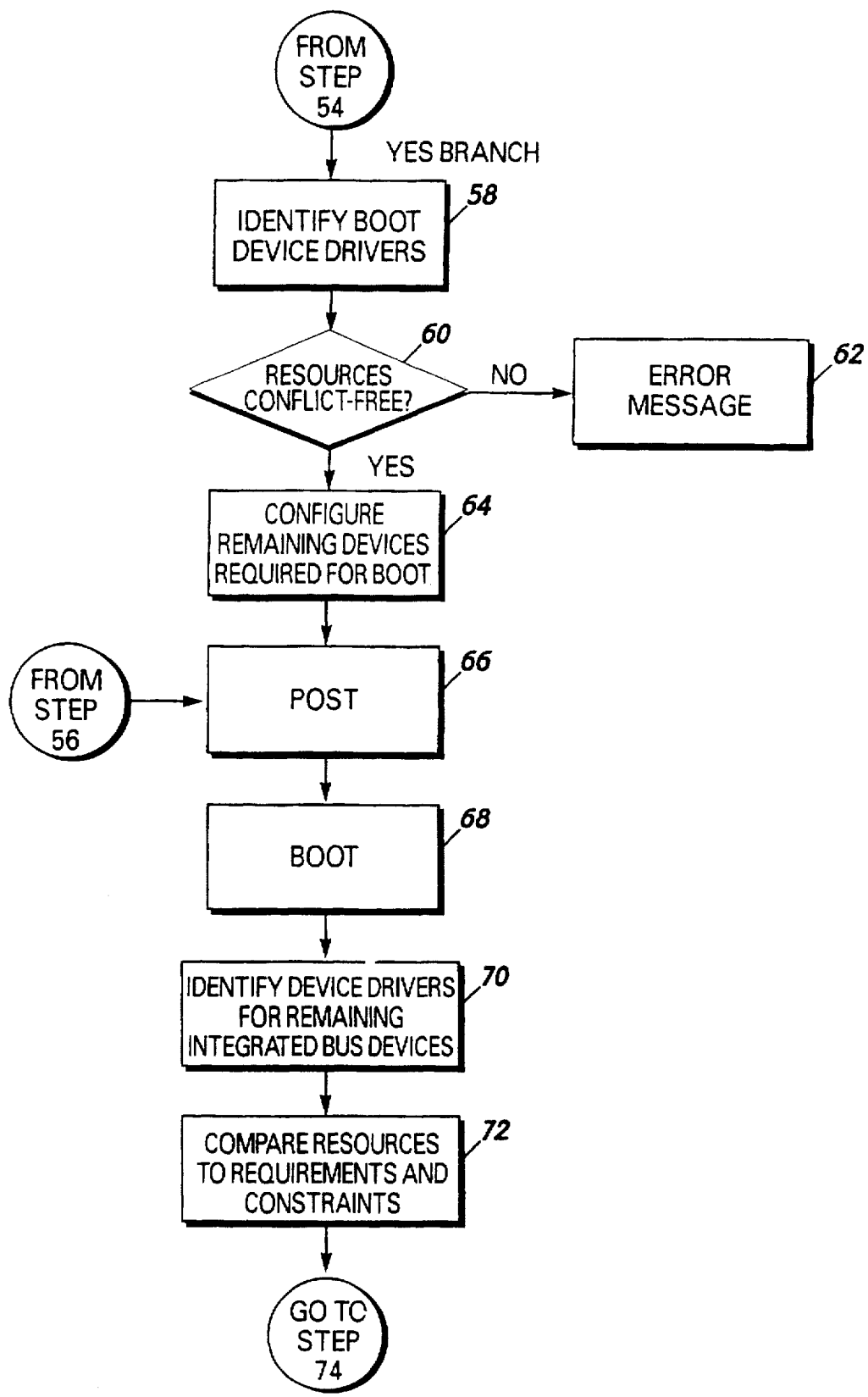
Figure 4C:
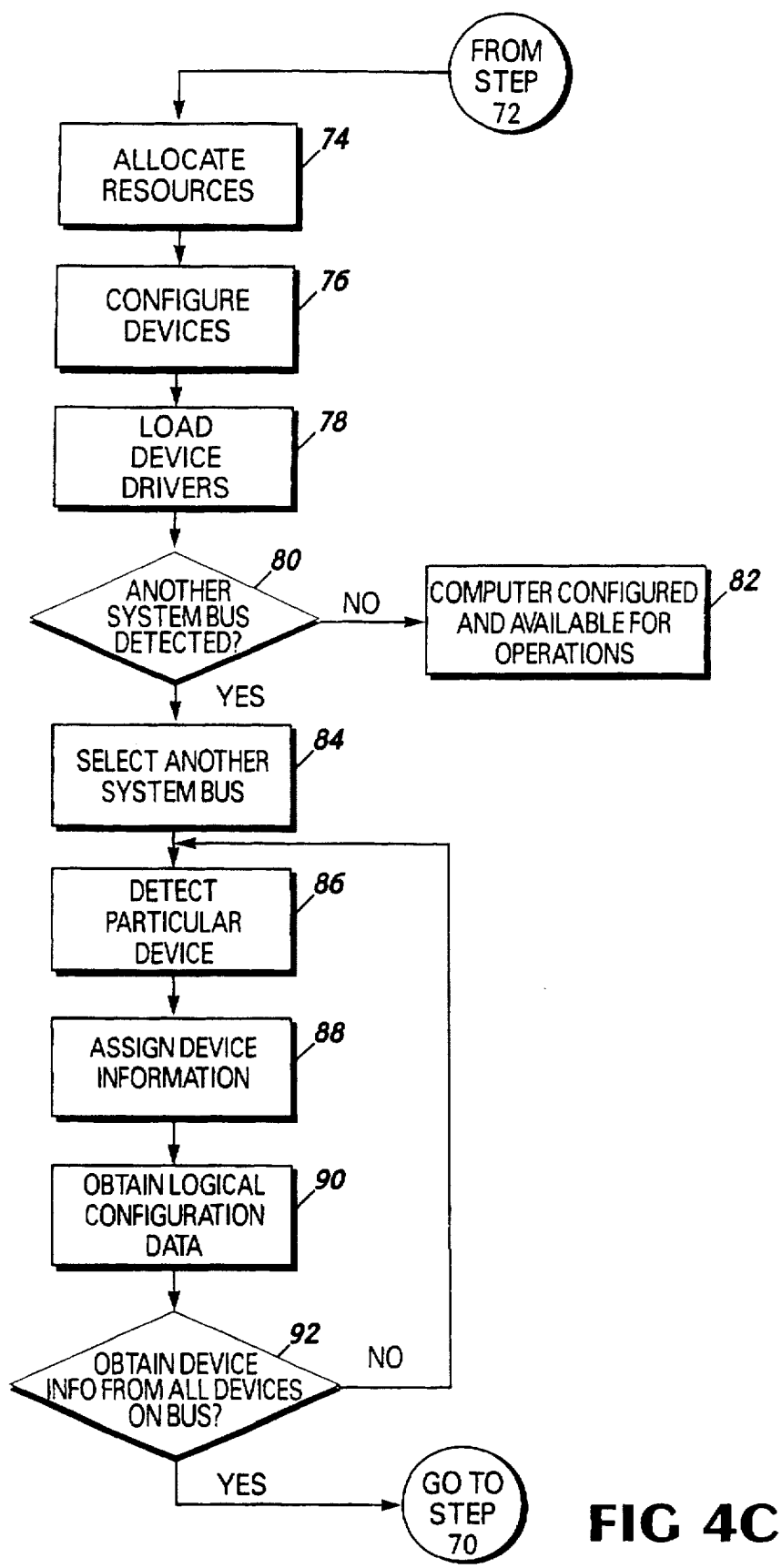

FIGS. 4A–C are flow chart diagrams illustrating the preferred steps of a method for configuring the devices of a computer system. Referring now to FIGS. 4A–C, which are collectively described herein as FIG. 4, and to FIG. 1, the configuration process is initiated in step 41 by powering-up the computer 8.

In step 42, certain devices 20 on the system board, which are also described as system-level devices, are configured in response to powering the computer 8. These system-level devices, which are configured based upon power-on default configuration settings, typically include I/O interfaces, the keyboard controller, the serial and parallel interfaces, the display controller, the system timer, the PIC, and the DMA controller. It will be appreciated that many of these components are mounted on the motherboard of a conventional personal computer. The system-level devices are preferably configured based upon default configuration parameters stored in the computer control system 21. The default configuration parameters for the system-level devices in the computer 8 are defined by the resource requirements and resource dependencies for such devices.

The preferred configuration process is based upon the collection of device-specific information from each of the devices 20 of the computer 8 to support the allocation of the resources 14 to those connected devices. Thus, still referring to FIGS. 1 and 4, the preferred configuration process continues for the devices 20 that are connected to the system-level expansion bus of the computer 8, specifically the integrated bus 15. In step 44, the integrated bus 15 is selected and an enumerator (not shown) is loaded for the ISA bus. In subsequent steps, each of the devices 20 connected to the ISA bus of the computer 8 is examined to obtain device information.

In step 46, one of the devices 20 on the selected ISA bus is detected to enable the communication of device information from the detected device 20. For the ISA bus, the detected device is isolated from the remaining devices on the bus to permit interference-free communications with that device. Nevertheless, it will be appreciated that other types of system busses do not require isolation of the detected device to enable communications with that device. The preferred system for detecting the interface boards associated with the devices 20, isolating a particular interface board, and collecting device information is described in a related application, U.S. patent application Ser. No. 08/023,689, filed Feb. 25, 1993, entitled "System and Method for Computer Interface Board Identification," which is assigned to the assignee for this application and hereby incorporated by reference. The system described in the referenced application automatically determines which interface boards are connected to a computer bus and automatically assigns parameter selections to ensure proper operation of the boards within the computer.

At step 48, the detected device 20 is assigned a device identification code that preferably identifies the particular device as a certain device type connected to a selected bus, in this case, the integrated bus 15. The device identification code comprises an identification code and a system bus code. The identification code comprises a data string which uniquely define the corresponding device. The identification code can include characters defined by the well known American Standard Code for Information Interchange (ASCII) or a combination of ASCII and non-ASCII data bytes. Similarly, the system bus code, which also can be implemented as a string of ASCII characters or a combination or ASCII and non-ASCII data, uniquely identifies a corresponding system bus. The identification code is typically supplied by the device 20, whereas the system bus code is associated with the system bus 18 and is generated external to the device 20. For example, a modem is preferably assigned an identification code that is different from the identification code for a printer, and different architecture expansion busses, such as ISA and MCA busses, are preassigned different system bus codes. Thus, the identification code defines the detected device and the system bus code defines the selected system bus that supplies the connection for the detected device.

For the preferred embodiment, the identification code is used to identify the class or the type of the device 20. The vendor of the peripheral device associated with the device 20 typically defines the unique identification code for that device. Nevertheless, it will be appreciated that the identification code does not need to contain any information about the class or the type of the device 20. Indeed, the only requirement for the device identification code is that the data string formed by this combination of the system bus code and the identification code should be consistently used each time the computer 8 boots to uniquely identify the particular device 20 on the selected bus 18.

The collection of device information continues at step 50. Specifically, logical configuration data is obtained for the detected device 20. The logical configuration data is preferably logically linked to the device identification code for the particular device 20. This device information is preferably stored in nonvolatile memory that is allocated for such use by the operating system 10. In addition, if the particular device 20 represents a newly installed device for the computer 8, then the device information is also stored within the computer database 16 to maintain an archival record of all of the devices 20 that have been installed for operation with the computer 8.

The logical configuration data defines the set of resources 14 necessary for operation of the particular device 20 with the computer 8. Specifically, the logical configuration data comprises both resource requirement information and resource dependency information. The resource requirement information defines certain resources 14 which are necessary for operation of the particular device 20. It will be appreciated that computer resources, such as the resources 14, include multiple resource options or elements, such as allocated memory ranges and a predefined set of interrupts, DMA channels, and I/O ports. Thus, the resource requirement information preferably defines a range of elements for each of the resources 14 required for the operation of the associated device. For example, a printer may require a communications port within a range of the I/O ports 28. In contrast, the resource dependency information defines a particular combination of resource elements which are necessary for the operation of the particular device 20. For example, the resource dependency information for a modem may define a specific combination of an interrupt and an I/O port for the operation of that device.

Upon completing the collection of device information from the detected device 20, an inquiry is conducted at step 52 to determine whether device information has been obtained from all of the devices 20 on selected bus, in this case, the integrated bus 15. If the answer is negative, the "NO" branch is followed to the step 46 to continue the collection of device information from the remaining devices 20 on the integrated bus 15. In contrast, the "YES" branch is followed to the step 54 if device information has been acquired from all such devices 20. At this point, the device identity data and resource usage information have been obtained for each device 20 that either is a system-level device or is directly connected to the integrated bus 15.

In step 54, an inquiry is conducted to identify the subset of the devices 20 that must be active upon completion of the boot process. For the devices 20 that do not require a default-type configuration during the power-up sequence, the "NO" branch is followed to the step 56 and those devices preferably remain inactive during the power-up sequences. In contrast, the "YES" branch is followed from the step 54 to the step 58 for the devices 20 that must be activated during the boot process. Based upon this inventory of the identified devices 20 requiring activation during the boot process, a boot-level device driver for each of those devices is obtained in step 58 to enable communications between the boot-level devices and the computer 8. These boot-level devices typically include the system-level devices 20 on the system board of the computer 8 and certain adapter boards connected to the integrated bus 15, such as a display controller or a mass memory storage device controller, i.e., a fixed disk controller.

In step 60, an inquiry is conducted to determine if the resources 14 required by the set of identified devices 20 requiring enablement for the boot process are conflict-free. If so, the "YES" branch is followed to step 64. The resources required by these devices 20 are allocated during the step 64 and the required device drivers are subsequently loaded to permit boot-level operations. Alternatively, if the response to the inquiry in step 60 is negative, then the "NO" branch is followed to step 62 and the user is preferably supplied an error message based upon the detection of a resource conflict during the boot process. In response, the user may be required to power down the computer and manually reconfigure the computer 8. However, it is not anticipated that a resource conflict for boot-level devices will be a common occurrence because the configurations for many of the boot-level devices mounted on the system board are typically pre-defined to be conflict-free by the computer vendor.

The above-described configuration steps 42-64 are preferably supported by software routines for the modified BIOS program of the computer control system 21. The modified BIOS program supports the identification of each of the boot-level devices, including system-level devices and the boot-level devices on the integrated bus 15, and stores device-related information within computer memory to support the configuration tasks for those devices. With the exception of the system-level devices, the configuration support supplied by the modified BIOS program concludes after the POST process is completed. Specifically, after POST, the control of the configuration process for all remaining devices 20 is preferably maintained by the operating system 10 rather than by the computer control system 21.

Upon completion of this portion of the configuration process, the conventional POST and BOOT routines are then conducted for the computer 8 during the steps 66 and 68, respectively. As a result of loading the operating system 10, selected configuration files of the operating system 10, such as Config.Sys and the Autoexec.Bat files, are processed by the computer 8. The Config.Sys file is a system configuration file that contains parameters which determine how the computer will operate. The Autoexec.Bat file supports user customization of computer operations, particularly the handling of application programs. The operations of both Config.Sys and Autoexec.Bat files for conventional operating systems are well known and will not be described herein.

Although FIG. 4 shows a specific sequence for the POST and BOOT routines, it will be understood that the configuration process can be adapted to operate with a different sequence of those routines. For example, at least a portion of the task operations of the POST routine can be completed after power-up and prior to the configuration of system-level devices in step 42.

Unlike the system board devices and the boot-level devices connected to the integrated bus 15, which are respectively configured during steps 42 and 64, the remaining devices 20 connected to the integrated bus 15 are configured only after the boot operations for the computer 8 have been completed. However, the configuration operations for the nonboot-level devices on the integrated bus 15 are supported by the collection of device information that occurred prior to the BOOT process of step 68. In particular, this configuration process is supported by the current inventory of both the system board devices and the set of devices 20 connected to the integrated bus 15.

At step 70, the device drivers for this set of nonboot-level devices are identified in response to the device information collected during the preboot operation. The device drivers are typically identified by accessing corresponding device-related information that is stored in the computer database 16 or by accessing a predefined file of the operating system 10. The process for identifying and obtaining the device drivers will be described in more detail below with respect to FIG. 5.

The device information collected during the preboot operation further supports the allocation and the assignment of the resources 14 required by the nonboot-level devices on the integrated bus 15. In step 72, the resource requirements and dependencies for each of the nonboot-level devices 20 on the integrated system bus 15 are compared to the available resources 14. This comparison permits a determination of whether a potential resource conflict exists. In an iterative fashion, potential resource conflicts are arbitrated and resolved prior to resource allocation. In step 74, the resources 14 are allocated to the nonboot-level devices 20 based upon the arbitration results of the step 72 and those devices are configured in step 76. In view of the allocated resources, the identified device drivers are loaded in step 78 and the devices are enabled for operation with the computer 8. This arbitration process is described in more detail below with respect to FIG. 13.

For the system board devices and the set of devices directly connected to the integrated bus 15, device information has now been collected and stored in volatile computer memory and, as required for newly installed devices, in the nonvolatile memory of the computer database 16. The device information for the devices 20 on the integrated bus 15 may identify one or more of the devices as another system bus 18 capable of supporting other connected devices 20. Device information has not yet been collected for the "children" devices of each system bus 18 connected to the integrated bus 15. Nevertheless, for the preferred embodiment, the tasks of identifying device drivers, arbitrating and allocating the resources 14, and loading the identified device drivers for the set of nonboot-level devices 20 on the integrated bus 15 enable the subsequent collection of device information from these children devices. Thus, at step 80, an inquiry is conducted to determine whether any of the devices 20 on the selected integrated bus 15 are operable as system busses. If not, the "NO" branch is followed to step 82 and the automated configuration operation for the computer 8 is completed. In contrast, if another system bus is connected to the computer 8, then the "YES" branch is followed to step 84 to continue the data collection process.

Referring still to FIGS. 1 and 4, in step 84, another one of the system busses 18 is selected to support the configuration of the set of the devices 20 connected to that selected bus. For the illustrative example of FIG. 1, the interface bus 17' is selected and the enumerator for that bus is loaded. One of the devices 20 on the interface bus 17' is subsequently detected in step 86. At step 88, the detected device 20 is assigned a device identification code comprising the identification code for the detected device and the system bus code for the interface bus 17'. Likewise, logical configuration data is obtained for the detected device 20 during the step 90 to define the resources 14 necessary for operation of the device.

Upon completing collection of device information from the detected device 20, an inquiry is conducted at step 92 to determine whether device information has been obtained from all of the devices connected to the interface bus 17'. If the answer is negative, the "NO" branch is followed to the step 86 to continue the collection of device information from those remaining devices 20. In contrast, the "YES" branch is followed to the step 70 to enable the sequence of identifying device drivers, arbitrating and allocating the resources 14, and loading the identified device drivers for the detected devices 20 of the interface bus 17'. This process will be repeated until all of the system busses 18 within the computer 8 are detected.

It will be understood that the device information collection process has now been completed for the existing devices 20 of the computer 8. Specifically, the device identification code and the logical configuration information have been collected from each of the devices 20. This device information is preferably stored in the computer memory 22 to support any additional configuration operations that are necessitated by another asynchronous event affecting the operating state of the computer 8.

It will be appreciated that existing personal computers generally do not include a modified BIOS program to implement the specific sequence defined by the steps 42 through steps 64 for the configuration process shown in FIG. 4. Accordingly, for computers with a conventional BIOS program, the system board devices are configured by the BIOS program and the initialization processes performed by the POST and BOOT routines are conducted in a known manner in response to powering the computer system. After the completion of the boot sequences, an embodiment of the present invention supports the automated configuration of the remaining devices connected to this computer system.

Specifically, upon booting the computer, this postboot configuration process for a conventional computer starts at step 84 by selecting one of the system busses 18. However, unlike the previously-described configuration operation, the integrated bus 15 is selected only after the completion of the BOOT routine. In this manner, the sequence of tasks starting at step 84 of FIG. 4 are completed to identify and characterize the existing devices 20 of the computer 8, to identify the associated device drivers, to allocate the resources 14, and to load the device drivers.

Referring now to FIG. 1, a device driver for an associated device 20 can be obtained from one of several alternative sources of the computer system 8, including the operating system 10, the device 20 itself, or indirectly from the user via a disk containing the device driver. The preferred operating system 10 includes one or more files that contain device drivers for supporting the most commonly used peripheral devices and add-on type adapter boards. Similarly, the memory storage device 29 located on certain adapter boards also can be used for storing device drivers for operating the associated device with a personal computer. In addition, conventional peripheral devices and adapter boards are often times supplied by vendors with one or more computer disks containing installation software programs and supporting software programs, including device drivers. Upon loading a device driver for use by the computer 8, the device driver is typically stored on the computer's mass storage memory device, such as a fixed disk.

To maintain an archival record for each device 20 installed on the computer 8, the device information for a particular device is stored within a corresponding record of the computer database 16. Thus, the central database 16 preferably maintains a set of records containing a listing of the identification codes for the devices 20 of the computer 8 and a listing of compatible device information. Each record contains a device identification field for storing an identification code associated with a certain primary device and a compatible device identification field for storing identification codes associated with both a primary device and corresponding compatible devices. A compatible device is a device that performs the same functions to achieve the same results in the same manner as the primary device. For example, a first modem card may be compatible with a second modem card because both cards perform the same function and conform to an industry standard for modem communications.

The compatible device identification field also permits the recording of priority data to permit a further distinction between the devices compatible with a primary device. For example, this priority data can include vendor-assigned ranking data and is supplied by ranking the identification codes for compatible devices in the preferred order of use. In this manner, priority data is supplied by the order in which the identification codes within the compatible device identification field are listed.

Table 1 shows a several of the data fields for a record of the computer database 16. The first field, which is labeled "Device Identification", contains identification codes for the devices 20. The second field, which is labeled "Compatible Device Identification", contains identification codes and related information for compatible devices. This information represents at least a portion of the data stored in typical record in the computer database 16.

TABLE 1

| Device Identification Identification Code | Compatible Device Identification Identification Code |
|---|---|
| Audio B3 | Audio B3 Sblast Windows Sound |

As shown in Table 1, each identification code in the device identification field has one or more corresponding entries in the compatible device identification field, namely entries for identification codes and installation dates. A primary device is identified in the device identification field by the identification code "AudioB3". The compatible device identification field also contains the same identification code. When the device identification field and the compatible device identification field contain the same identification code, a device driver specifically designed for use with the identified device is available on the computer 8. This type of device driver is also described as a primary device driver. Thus, for the example shown in Table I, the primary device driver is available to support the operations of the particular device 20 identified by the entry "Audio B3" in the device identification field.

The primary device driver, if available, is preferably obtained to support the operations of the corresponding device 20. If the primary device driver is not available, then the compatible device identification field is preferably searched for an entry representing a compatible device. If at least one compatible device entry is present, then a device driver that is compatible with the primary device is available on the computer 8. It is well known that a device driver may support the operations of both the intended primary device and one or more other compatible devices sharing similar operating characteristics with the primary device. Thus, a "compatible" device driver, if available, may be used to enable communications of the particular device 20 with the computer system 8 in the absence of the primary device driver for that particular device. It will be understood that the primary device driver is intended to support the computer operations of the primary device, whereas each compatible device driver supports computer operations for the primary device and other compatible devices.

The compatible device identification field in Table 1 further shows a pair of identification codes associated with devices that are compatible with the "AudioB3" device, namely the devices identified by the codes "Sblast" and "Windows Sound". Compatible devices are identified by identification codes having names that are dissimilar to the identification code for the primary device.

For the preferred embodiment, the selection of a device driver corresponding to a compatible device is determined by the following convention: if a primary device driver is not available to support the particular device, then the device driver for the compatible device having the highest priority ranking is selected from the compatible device driver candidates. The identification code for the compatible device having the highest priority ranking is preferably listed within the compatible device identification field prior to any of the remaining identification codes. Thus, the identification codes for compatible devices are ordered based upon priority ranking assigned to those devices. Assuming the absence of the identification code for that primary device in the compatible device information field, this convention indicates that the "Sblast" device driver should be selected to support the "Audio B3" device based upon the order of the identification codes for the listed devices.

Figure 5:
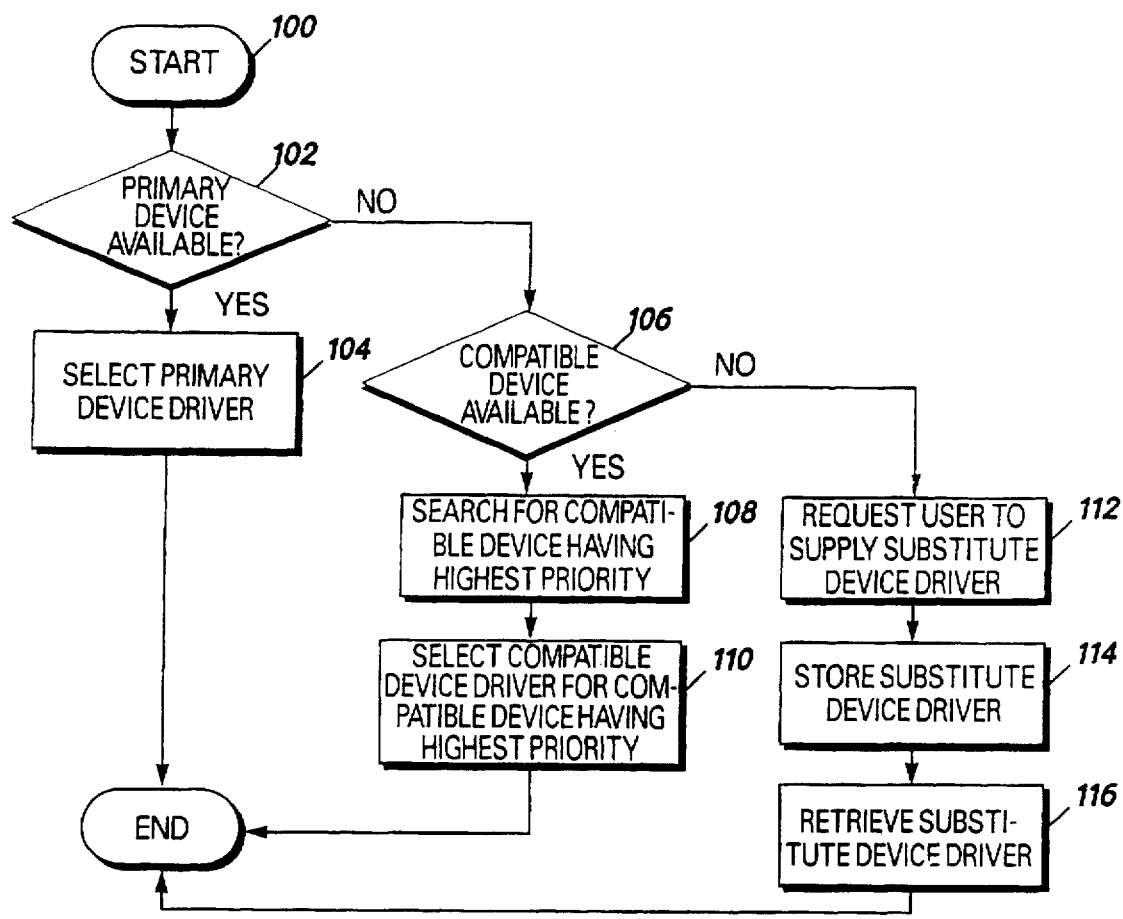
FIG. 5 is a flow chart diagram that illustrates the preferred steps for a method for obtaining a compatible device driver for use with a device of the computer system.

FIG. 5 is a flow chart diagram that illustrates the preferred steps for a method of obtaining a device driver for use with a device of the computer system. Turning now to FIGS. 1 and 5, a computer-implemented process for obtaining a device driver is started in step 100 and proceeds to step 102, where a determination is made whether the records of the computer database 16 contain an entry designating that a primary device driver corresponding to the particular device 20 is available on the computer 8. To locate the record associated with the particular device 20, the computer database 16 is searched by using the identification code for the particular device 20 as the entry key. If the identification code for the particular device 20 is found in both the device identification and compatible device identification fields of a selected record, then the "YES" path is followed to step 104. This affirmative response indicates that the primary device driver for the particular device 20 can be obtained on the computer 8. A device driver maintained by the computer 8 typically can be retrieved by accessing a corresponding file on the fixed disk of the computer 8 and reading the stored device driver. For the preferred operating system 10, certain device-related information, including the identity of device drivers for the corresponding device, is stored within information files called .INF files. In the step 104, the device driver corresponding to the primary device is selected and assigned for use by the particular device 20. The process concludes if the primary device driver is available. In contrast, if a positive match is not achieved, then the "NO" path is followed to the step 106.

If the primary device driver for the device 20 is not available, then the compatible device identification field for the selected record is preferably searched in step 106 for an identification code that corresponds to a device that is "compatible" with the particular device 20. If one or more of the identification codes representing compatible devices are contained in this field, then the "YES" branch is followed to the step 108. In step 108, the compatible device identification field is also searched for the identified compatible device having the highest priority ranking. The preferred compatible device is listed first within the compatible device identification field. Upon finding the preferred compatible device, the process proceeds to the step 110. In the step 110, the device driver corresponding to the compatible device having the highest priority ranking is selected and assigned for use with the particular device 20, thereby concluding the search for a compatible device driver.

If the response to the step 106 is negative, then the "NO" branch is followed to the step 112. The user is requested in step 112 to supply a substitute device driver for the supporting operation of the device with the computer system 8. This request is typically supplied as a text-based statement displayed on a display or monitor for the computer system 8 or as an audio prompt generated by the computer system 8. In response to the request, the user can insert within the appropriate computer drive a flexible disk or another form of appropriate electronic media containing the device driver program, thereby permitting the computer 8 to access the device driver program. In response to reading the disk, in step 114, the computer 8 stores the device driver program on a selected mass storage memory device.

In step 116, the substitute device driver is obtained and instructed to enable the particular device 20 for operation with the computer 8. In addition, to maintain the records on the computer database 16, the identification code for the device associated with the new substitute device driver is listed in the appropriate record(s) of the computer database 16. This database update is achieved by adding the identification code for the device driver within the compatible device identification field for the record associated with the particular device 20. In this manner, the archival record indicates that the substitute device driver supports the operations of the particular device 20 and has been installed for use on the computer 8.

Automated Configuration System Components

Figure 6:
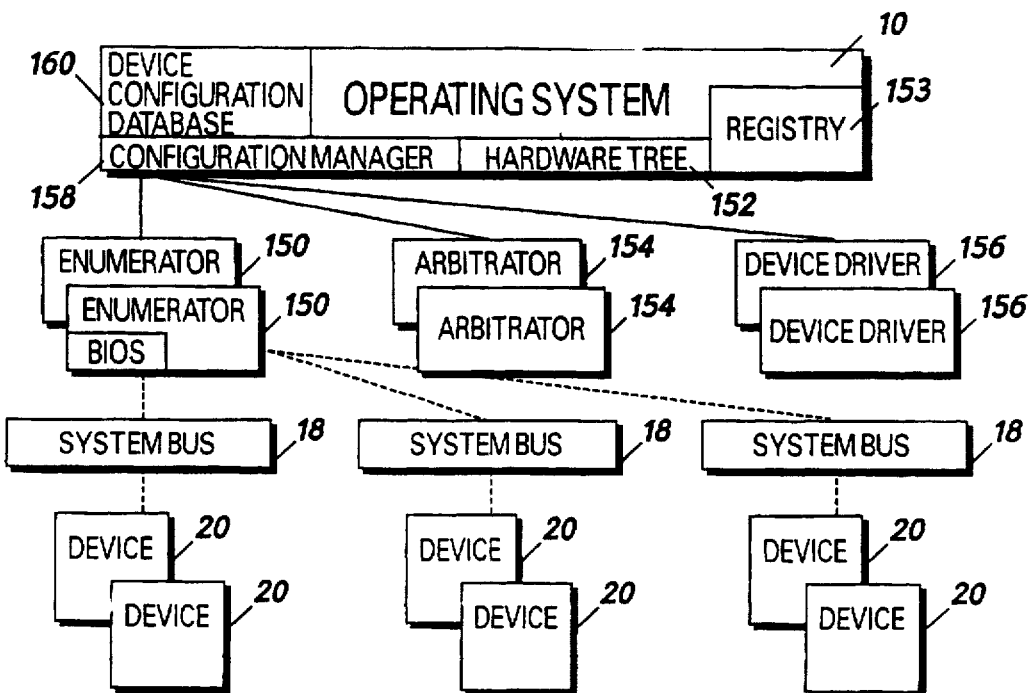
FIG. 6 is a block diagram that illustrates the components of the preferred embodiment of the present invention.

FIG. 6 is a block diagram that illustrates the components and their structural communications links for the preferred embodiment of the operating system 10. Referring to FIGS. 1 and 6, the operating system 10 comprises numerous software programs or modules, including enumerators 150, a hardware tree 152, a registry 153, arbitrators 154, device drivers 156, a configuration manager 158, and a device configuration database 160. The enumerators 150, the registry 153, the arbitrators 154, and the device drivers 156 are associated with the configuration manager 158. It will be understood that the operating system 10 also preferably interacts with a modified BIOS program of the computer control system 21 and various hardware components of the computer 8, including the system busses 18 and the devices 20, to support the configuration system.

Figure 7A:
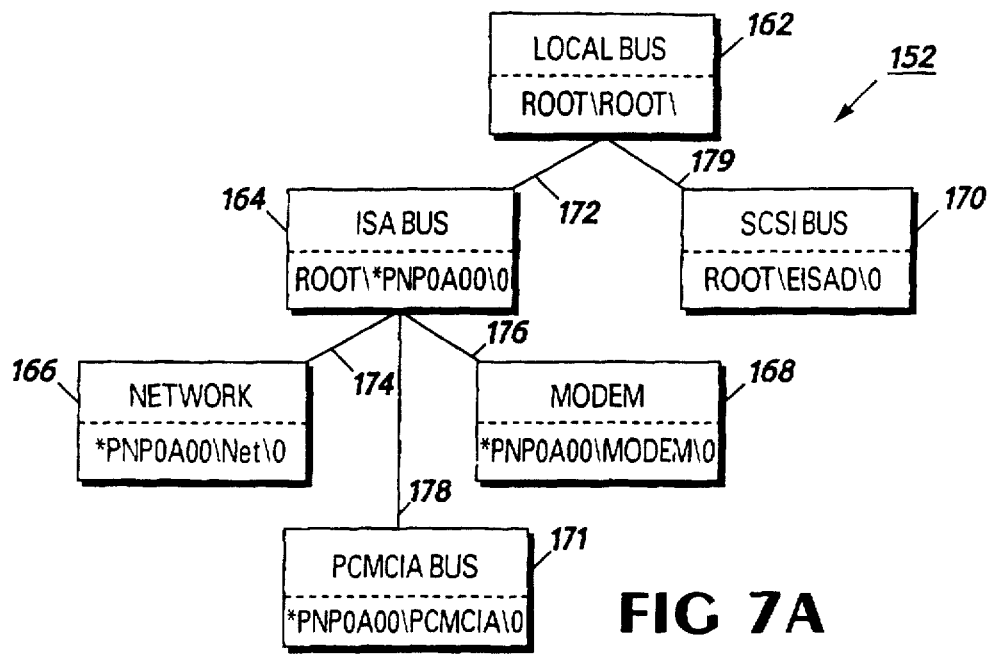
FIGS. 7A and 7B are diagrams that illustrate one of the components of the preferred embodiment of the present invention, specifically a hardware tree comprising device nodes for storing device-related information for the present configuration of the computer system.
Figure 7B:
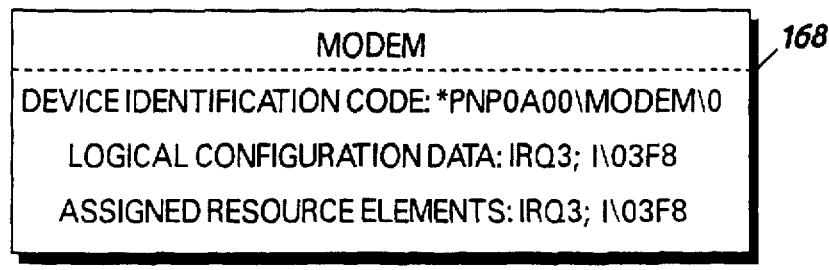
Figure 8:
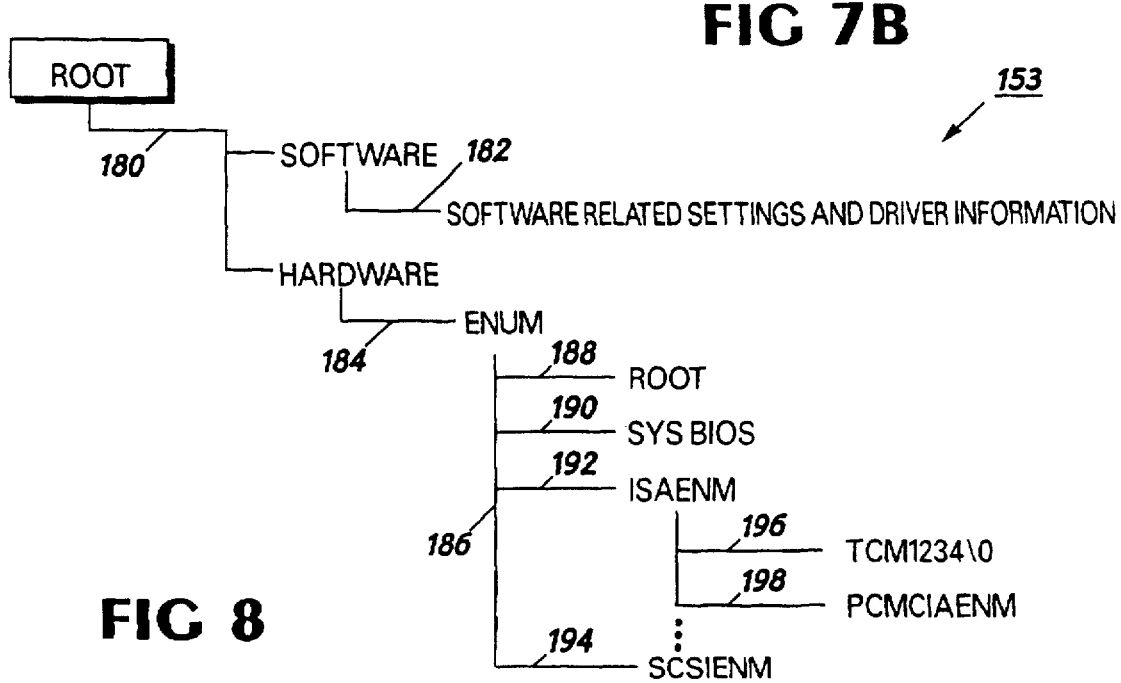
FIG. 8 is a diagram that illustrates one of the components of the preferred embodiment of the present invention, specifically a registry for storing archival device-related information for the computer system.

These components are generally described within sections headed by their respective identifying legends and are best shown in FIGS. 6–8. A more detailed review of certain components, namely the enumerator 150 and the arbitrator 154, is also supplied below with respect to FIGS. 9–13.

Enumerators

The enumerators 150 operate to report the identities of detected devices 20 on the system busses 18 in response to certain events that affect the operating state of the computer 8. These events include changes to the state of power supplied to the computer 8, including the states Power-on, Standby, Suspend, or Resume. The events also include the insertion of a device onto or the removal of a device from a system bus, or the insertion into or the removal of a computer system from a docking station or an expansion chassis. It will be appreciated that this connection (or removal) of a device 20 to the computer 8 can be completed by a physical connection or as a logical connection via a wireless communication link or a network. In addition, for certain devices 20, the enumerators 150 also can transmit assigned resource elements from the configuration manager 158 for use by the devices 20 in response to an allocation of the resources 14.

Each enumerator 150 is assigned to a component of the computer 8 that is capable of having children, namely, those components that provide a connection for yet another hardware component. It will be understood that computer busses, such as the system busses 18, represent a common mechanism for connecting adapter boards and peripheral devices to a personal computer. In similar fashion, for the preferred computer control system 21, the modified BIOS program represents a mechanism for providing a central connection for the system-level devices of a personal computer, including the interfaces for the keyboard controller, the display controller, the I/O controller, and the serial and parallel controllers. Thus, for a typical personal computer, the enumerators 150 can be assigned to the computer busses and to the modified BIOS program that supports the configuration of boot-level devices. For the computer 8 shown in FIG. 1, individual enumerators 150 are assigned to the system busses 18, including the local bus, the ISA bus, SCSI bus, and the PCMCIA bus, and to the modified BIOS program of the computer control system 21.

For each system bus 18, the associated enumerator 150 is programmed to recognize the operating characteristics of its assigned computer bus and to support the configuration of the devices 20 connected to that computer bus. Specifically, these enumerators obtain device-related information from the devices 20 and subsequently store such information within a central memory location of the hardware tree 152. As outlined above, this collection of device information is initiated in response to the events affecting the enumerator's assigned system bus 18, such as the insertion or removal of a device or a change in the power state of the computer 8. It will be understood that this collection of device information from the devices 20 in the computer 8 is described as an enumeration process.

Likewise, for the computer control program 21, an enumerator 150 can be programmed to recognize the system-level devices of the computer 8 and to support the configuration of those system-level devices. The enumerator 150 assigned to the modified BIOS program accesses the default-type configuration parameters for the system-level devices from the modified BIOS in response to events affecting the computer's operating state, including the power-on event, and stores this information within the hardware tree 152. Furthermore, the enumerator 150 for the modified BIOS program can be programmed to detect the insertion of the computer into or the removal of the computer from a docking station and outputs an indication of these events to the configuration manager 158.

A unique system bus code is associated with each of the enumerators 150. For example, the ISA bus enumerator has a particular system bus code that is different from the system bus code assigned to the MCA bus enumerator. An enumerator 150 forms a device identification code for each device 20 connected to the assigned system bus 18 by appending its system bus code to the identification code for the device 20. The device identification code also can include an instance number that is assigned by the enumerator 150 to distinguish identical devices 20 connected to the same system bus 18.

An instance number can be obtained by the enumerator 150 from the device 20 itself, if available, or is assigned to the device 20. By way of example, for the ISA bus, the ISA bus enumerator assigns an instance number to a logical device based upon a serial number that is stored in the memory storage device 29 associated with that device. If no serial number is available for the device 20, then the enumerator 150 is required to use some other unique attribute to generate an uniquely addressable instance number. For the PCMCIA bus, an alternative scheme for assigning an instance number is based upon the use of the slot number for the bus socket connected to the device 20.

The enumerator 150 also obtains logical configuration data for each of the devices 20 of the computer 8. Logical configuration data is preferably linked to corresponding device information to maintain a logical link with the represented device 20. For a typical device, the device identification code and the logical configuration data, which are collectively referred to as device information, are preferably stored within a device node associated with that device. Each device node is preferably maintained in the tree-like memory structure of the hardware tree 152, as described below.

As a result of the resource assignment process, the enumerators 150 receive data packets containing assigned resource elements for the devices 20. In response to receiving an assignment of the resources 14 for a particular device, the enumerator 150 accesses the appropriate device node to store the resource assignment. In this manner, the assigned resource information is maintained in a central memory location that is accessible by the device and, as required, by the device driver corresponding to that device. Thus, it will be appreciated that the assigned resources for the each of the devices 20 are stored within corresponding device nodes.

The enumerators 150 provide an abstraction layer that effectively separates the controller portion of the operating system 10, the configuration manager 158, from the underlying bus structures of the computer 8. By placing the system bus-level information within the inventive concept of the driver-like enumerators 150, the operating system 10 can be adapted to operate with a variety of present and future computer bus architectures. Thus, unlike conventional operating systems, the configuration manager 158 can communicate with a variety of system busses without any knowledge of the characteristics of those system busses because such information is supplied by the abstraction layer of the enumerators 150. The structure and operations of the enumerators 150 are described in more detail below with respect to FIGS. 9 through 11.

Hardware Tree

The hardware tree 152 supplies a hierarchical representation of the device identities, the resource usage requirements, and the resource assignments for the present devices 20 operating with the computer 8. The data structure for the hardware tree 152 is maintained in a hierarchical arrangement of device nodes within an allocated portion of the nonvolatile memory supplied by the computer memory 22. This stored information can be accessed by the operating system 10, specifically the configuration manager 158, by device drivers, or by application programs (via a common interrupt).

Each device node in the hardware tree 152 represents one of the devices 20 presently installed for operation with the computer 8 and generally contains three main attributes that describe the capabilities and resource requirements for that device. Upon the completion of data storage, the device node will include the device identification code, the logical configuration data, and the assigned resource elements. The device identification code is useful for accessing the hardware tree 152 and maps into a unique entry key for the archival data structure of the registry 153. It will be appreciated that the device information for each device 20 is stored within a corresponding device node to enable all information pertaining to a common device to be maintained in a central storage location with the hardware tree 152.

The device information collected from the devices 20 by the enumerators 150 is used to populate the device nodes of the hardware tree 152. However, it will be understood that certain existing interface boards or peripheral devices do not include a mechanism for storing configuration data. Upon identifying these "legacy" devices, at least a part of the hardware tree 152 can be populated when the configuration manager 158 copies information for those devices to the hardware tree 152 from an available information source, such as the device configuration database 160 or text-based information files stored on a mass memory storage device of the computer 8.

Because the hardware tree 152 reflects the identities, resource requirements, and current resource allocations for the existing devices 20, the data stored within the hardware tree 152 can change each time the computer 8 boots with a new hardware configuration or in response either to adding a new device or to removing an existing device. Likewise, the insertion into or withdrawal of the computer 8 from a docking station can modify the data stored by the hardware tree 152. Accordingly, it will be appreciated that the hardware tree 152 is a computer database containing device information which reflects a snapshot of the characteristics for the devices presently installed for operation with the computer 8.

A user can access the device configuration information in the hardware tree 152 to verify the present configuration of its computer system. Access to this useful information can be achieved by either local or remote communications means, such as directly from the computer itself or via a network.

Referring to FIG. 7A, which illustrates the tree-like data structure of the hardware tree 152 for the computer 8 shown in FIG. 1, the hardware tree 152 contains a set of device nodes, including a device node 162 for the local bus, a device node 164 for the ISA bus, a device node 166 for the network card, a device node 168 for the modem card, a device node 170 for the SCSI bus, and a device node 171 for the PCMCIA bus.

A branch between any pair of the device nodes of the hardware tree 152 indicates that the connected device nodes share a common link. For example, upon entering the hardware tree 152, the device node 164 for the ISA bus can be reached only by first passing through the local bus device node 162 and a branch 172. This defines an interconnection between those system busses 18 (FIG. 1), thereby supplying an indication that the ISA bus is connected to the local bus. Likewise, both the network card and the modem card are connected to the ISA bus because branches 174 and 176 respectively extend from the device node 164 to the device nodes 166 and 168. In similar fashion, a branch 178 extending between the device nodes 164 and 171 indicates that the PCMCIA bus is connected to the ISA bus, and a branch 179 extending between the device nodes 162 and 170 indicates that the SCSI bus is connected to the local bus.

FIG. 7B illustrates the data structure for a representative device node of the hardware tree 152, in this case, the device node 168 for the modem card. Referring to FIGS. 7A and 7B, upon completion of the configuration of the modem card, the device node 168 preferably includes the device identification code, logical configuration data, and assigned resource elements. For the modem card, the device identification code is "*PNP0A00\Modem1234\0". A review of this device identification code indicates that the modem card is connected to the ISA bus, which is represented by the system bus code "*PNP0A00". In addition, the modem card is assigned an identification code "Modem1234\0" and is the first identified modem card of its type on the ISA base as evidenced by the instance number "0". The logical configuration data includes a specified combination of resource elements required for operation of the modem, in this case, the interrupt IRQ3 and the I/O port I/O3F8. This is followed by the assigned resource elements, which, for this example, include this same resource combination of the interrupt IRQ3 and the I/O port I/O3F8.

It will be appreciated that the above description of the attributes for the device node 168 is supplied as a representative example of the information that can be stored within a device node of the hardware tree 152. However, it will be understood that the data stored within the device nodes of the hardware tree 152 can be different because each device node contains data describing the identification and resource requirements for the represented device.

Registry

Returning now to FIG. 6, the registry 153 is a hierarchical, tree-structured database for storing various software and hardware parameters, including device information. The registry 153 is initially stored within the nonvolatile memory of the computer database 16 upon installing the operating system 10 for use on the computer 8. The registry 153 preferably contains hardware archival data, which is a superset of the memory-resident hardware tree 152, and software archival data containing software-related parameters and software driver information.

In contrast to the hardware tree 152, which contains device information for currently detected devices 20, the registry 153 contains a complete listing of any and all hardware components that have been installed on the computer 8. In this manner, even if a particular device 20 is removed for one session and then available again for the next session, the user will not be required to set-up the device again for the next session because all necessary device information is contained in the registry 153. Thus, if a particular device 20 is removed from the computer 8, the device information for that device 20 remains in archival storage within the registry 153.

FIG. 8 shows the tree-like data structure for the registry 153. Referring to FIGS. 6 and 8, a root key 180 includes two branches, the software archive 182, which contains software archival data, and the hardware archive 184 containing hardware archival data. The software archive 182 contains information related to location and identity of various program files, including the device drivers 156. The hardware archive 184 can contain hardware-related information, including the identity of detected devices; any user-defined configuration; the "last working configuration"; and information concerning the loading of device drivers. The information maintained by the software archive 182 and the hardware archive 184 is organized into logical classes and additional branches extending from the archive branches are associated with the classes or categories of this information.

Focusing on the hardware archive 184 in FIG. 8, an ENUM branch 186, which represents the enumerators 150 for the operating system 10, extends from the hardware archive 184. The ENUM branch 186 includes the enumerator branches 188, 190, 192, and 194, which define the respective enumerators 150 for the local bus (root), the modified BIOS program (SysBIOS), the ISA bus (ISAENM), and the SCSI bus (SCSIENM). It will be understood that the device identification codes, which are assigned by each enumerator 150 to the detected devices 20, operate as a key to the corresponding entries in the hardware archive 184 of the registry 153.

The registry 153 also contains device branches for each of the devices 20 that have been installed during both past and present operations of the computer 8. These tree-like device branches, which can extend from each of the enumerator branches, such as the branches 188, 190, 192, and 194, represent the past and present devices of the computer 8. The device branches preferably contain pertinent device-related data, including an identification code, logical configuration data, and a pointer to the device driver for that device. Accordingly, the device branches, such as the branches 196 and 198, represent the archival device-related information for devices that have operated in the past or at present with the computer 8 and can extend from each of the enumerator branches 188, 190, 192, 194.

The root branch 188, which extends from the ENUM branch 186, can include device branches representing device-related information for existing devices 20 that lack a mechanism for storing the identification code and the resource usage data. These devices, which are typically referred to as legacy or static devices, can be represented by branches extending from the root branch 188. In similar fashion, the SysBIOS branch 190, otherwise referred to as the system BIOS branch, also extends from the ENUM branch 186 and can include device branches representing the system-level devices located on the motherboard of the computer 8. In addition, the SCSI branch 194, which extends from the ENUM branch 186, can include device branches representing device-related information for SCSI bus-compatible devices. Although it will be recognized that a personal computer is operable with system-level devices and one or more legacy devices and/or SCSI-compatible devices, device branches for these types of the devices 20 are not shown in FIG. 8 to simplify the illustration of the registry 153.

Device branches 196 and 198, which extend from the ISAENM branch 192, are examples of typical device branches and represent the devices 20 that have been or are at present connected to the ISA bus. It will be appreciated that the device branches 196 and 198 represent typical devices connected to the ISA bus in the computer 8 and are shown in FIG. 8 as examples of the device branch concept for the registry 153.

The Modem1234\0 branch 196, which extends from the ISA bus branch 192, indicates that a single device, in this case, the modem card having the identification code "Modem1234\0", is (or has been) connected to one of the system busses 18 (FIG. 1), namely the ISA bus. In general, the identification code can represent the manufacturer's identity, the model of the corresponding device, and the instance number. For this example, the manufacturer is "Modem", the model is "1234", and the instance number is "0".

The PCMCIAENM branch 198 extending from the ISA bus branch 192 indicates that another device 20 having the device identification code PCMCIAENM is (or has been) connected to the ISA bus. This device identification code indicates that the detected device 20 is actually another bus, specifically the PCMCIA bus, which is capable of supporting the connections of additional devices 20. Thus, the branch 198 also represents an enumerator branch because an enumerator 150 is assigned for the enumeration of any of the devices 20 connected to the PCMCIA bus. If the PCMCIA bus represented by this device branch is the parent for "children" devices, then the PCMCIAENM branch 198 can include device branches representing such devices on the PCMICA bus.

Arbitrators

Returning again to FIGS. 1 and 6, it will be seen that each of the arbitrators 154 is assigned to a particular resource 14. Arbitrators 154 operate to determine the assignments for their respective resources 14 in view of the resource requirements and dependencies for the devices 20 connected to the computer 8. The arbitrators 154 are programmed to recognize the characteristics of their assigned resources 14, including the specific elements of the corresponding resources. For example, the arbitrator 154 for the I/O ports 28 has a built-in knowledge base which confirms that a conflict can occur when assigning 16-bit addresses if the computer 8 is configured with one or more devices 20 that are performing 10-bit decoding operations. In addition, the arbitrators 154 preferably maintain a table of reserved resource elements to insure compatibility with the fixed designs of existing computer components. Reserved resource elements are generally available for use by certain devices 20 that are known to require the use of such resource elements.

In response to a potential working configuration for the detected devices 20, each arbitrator 154 operates to allocate its respective resource elements to the various devices 20 that require use of such resources during computer operations. For the computer 8, the arbitrators 154 are assigned to handle access to the message addresses for the memory 22, the interrupts 24, the DMA channels 26, and the I/O ports 28. The arbitrators 154 are implemented as individual components that are separate from the remaining portion of the operating system 10 to allow the extension of the preferred operating system to other possible resources of a personal computer.

The arbitrators 154 work in tandem with the configuration manager 158 to complete the allocation and assignment of resources 14 to the devices 20. For a selected arbitrator 154, the configuration manager 158 supplies one or more possible configurations of elements of the corresponding resource 14.

This possible configuration is based upon the device information acquired for all of the devices 20 of the computer 8. It will be appreciated that the resource portion of this device information, which can specify resource ranges, particular resource elements and resource dependencies for the devices, will support the prioritized ranking of possible configurations by the configuration manager 158.

For a selected resource 14, if a working configuration solution is developed by the corresponding arbitrator 154, then the resulting resource element assignments are supplied to the configuration manager 158 to enable the allocation of the assigned resource elements to the proper devices 20. However, if a potential resource conflict for a resource element is located by the arbitrator 154, then an error flag is set to advise the configuration manager 158 that a working configuration is not available for this possible configuration. In this event, the configuration manager 158 can either supply an alternative configuration to this arbitrator 154, if available based upon the device information, or can supply a message to the user that requests user input to resolve a resource conflict. Thus, it will be appreciated that the arbitrators 154 develop resource assignments for their respective resources 14 in an iterative fashion based upon the collected device information.

The structure of and the operations conducted by the arbitrators 154 will be described in more detail below with respect to FIGS. 12 and 13.

Device Drivers

Device drivers 156 support communications between the devices 20 and the computer 8. For proper computer operations, each device 20 is represented by a corresponding device driver 156. Information for the device drivers 156 is stored within the registry 153 or can be accessed by reading certain configuration files of the preferred operating system 10, such as the text-based information files called .INF files.

Configuration Manager

The configuration manager 158 controls the various configuration tasks conducted by the enumerators 150, the hardware tree 152, the registry 153, the arbitrators 154, and the device drivers 156. When the computer 8 boots, the configuration manager 158 instructs the enumerators 150 to identify the devices 20 of the computer 8, thereby enabling the acquisition of device information for those devices. The configuration manager 158 subsequently examines the device nodes of the hardware tree 152 and, for the devices 20 that are newly installed, will direct the transfer of device information to the registry 153 for archival storage.

The configuration manager 158 also controls the acquisition of appropriate device drivers 156 in response to the stored device information and directs the allocation of the resources 14 in response to the resource assignments supplied by the arbitrators 154. Assigned resources are distributed by the configuration manager 158 to the appropriate enumerators 150 to support the resource allocation operation. To complete the configuration process, the configuration manager then controls the loading of the device drivers 156. Accordingly, it will be appreciated that the configuration manager 158 effectively controls the configuration operations by operating as a "traffic cop" to direct the operations conducted by the other components of the operating system 10.

Device Configuration Database

The device configuration database 160, which is typically implemented as a program file of the operating system 10, contains information about known computer components, including certain devices 20, and their configuration requirements. Upon loading the operating system on the computer 8, this program file is preferably stored on a computer mass storage memory device.

Unlike the registry 153, the information stored in the device configuration database 160 does not necessarily represent data about the set of devices 20 that have been connected at one time or another for operation with the computer 8. Instead, the device configuration database stores general component-level information about existing devices that can be installed for operation with a conventional personal computer, such as the computer 8.

The configuration manager 158 can access the device configuration database 160 for each newly installed device represented in the hardware tree 152 and, if available, copies relevant information concerning the identified device into the registry 153. The relevant information, which typically includes compatible device information and known resource requirements and dependencies, is maintained in the registry 153 by linking this information to the identification code for the identified device 20. Thus, it will be understood that the identification code operates as an entry key for the device configuration database 160.

In addition, during the initial set-up of the operating system 10, information is preferably obtained from the device configuration database 160 for known "legacy" computer components that can be installed for operation with a conventional personal computer. Thus, this device information is preferably stored in the device configuration database 160 and, during the initial set-up of the operating system 10, transferred to the registry 153 under the root branch 188, as illustrated in FIG. 8.

Referring now to FIGS. 1, 6 and 7, the configuration tasks are preferably conducted in at least two phases, a first configuration phase occurring after the computer 8 boots, and a second configuration phase conducted at the time of device initialization. During the first configuration phase, the modified BIOS program of the computer control system 21 initiates the enumeration of the devices 20 that are system-level devices on the motherboard of the computer 8. Although a device node will be formed and stored within the hardware tree 152 for each of the system-level devices, most of these device nodes are not shown in FIG. 7 to simplify this explanation of the configuration phases. Thus, for purpose of this discussion, only the computer local bus 13 (root bus) and the integrated bus 15, specifically the ISA bus, are considered as being identified by the operation conducted by the enumerator 150 for the modified BIOS program.

As shown in FIG. 7, the device identification codes for the local bus and the ISA bus are respectively "Root\Root\" and "Root\*PNP0A00\0". Focusing specifically on the device node 164 for the ISA bus, the system bus code is "Root" and the identification code is "*PNP0A00\0".

After enumerating the system-level devices and detecting the integrated bus 15, device-related information is stored in the hardware tree 152 for the existing legacy devices that were designed for use with conventional personal computers. The legacy devices are preferably added to the hardware tree 152 under the local bus device node 162. Thus, the device node 170 for the SCSI bus is added at this time to the hardware tree 152 because the SCSI bus is considered to be an existing legacy-type device. For the device node 170, the system bus code is "Root" and the identification code is "EISAID," which in combination form the device identification code "Root\EISAD\0." At the conclusion of the first configuration phase, the hardware tree 152 contains the device nodes 162, 164 and 170, and the registry 153 has been updated as necessary to reflect any new device information contained in the hardware tree 152.

For the second configuration phase, the configuration manager 158 examines the hardware tree 152 for the entries associated with each device node of the hardware tree 152 and determines the set of devices 20 previously identified by the first configuration phase. In view of the entries for the system busses 18, specifically the ISA bus and the SCSI bus, the configuration manager 158 instructs the assigned enumerators 150 to conduct enumeration operations for the ISA bus and the SCSI bus. For the ISA enumerator, device information is acquired for each of the devices 20 directly connected to the ISA bus, specifically the adapter boards implemented by network card and the modem card, and a system bus 18, the PCMCIA bus. Thus, three new device nodes, the device nodes 166 (network card), 168 (modem card), and 171 (PCMCIA bus) are now added to the hardware tree 152 under the respective device identification codes "*PNP0A00\Net\0", "*PNP0A00\Modem\0", and "*PNP0A00\PCMCIA\0".

In response to the identification of the additional devices 20, the entries in the registry 153 also are updated to reflect the detection of newly installed devices as required. In turn, the appropriate device drivers 156 are identified for the network card and the modem card. The configuration manager 158 then instructs the appropriate arbitrators 154 to develop an assignment for the resources 14 based on the resource requirements and constraints for the detected devices 20. In particular, the configuration manager 158 calls a selected arbitrator 154 and, if it returns a valid resource allocation, then the configuration manager 158 will call the next arbitrator 154 until all resources are properly allocated. If an invalid allocation is returned by one of the arbitrators 154, the configuration manager 158 initiates a new round of exchanges with the arbitrators 154 based on other possible configurations supported by the various devices 20. The assigned elements of the resources 14 will be supplied by the configuration manager 158 to the detected devices 20 via the abstraction layer supplied by the enumerators 150.

Upon a determination of a proper working configuration and assignment of the necessary resources, the configuration manager 158 will instruct an associated device driver loader program (not shown) to load the identified device drivers 156. The identified device drivers 156 are then loaded to enable the operation of the network card and the modem card with the computer 8.

In view of the foregoing, it will be understood that a similar configuration process would be completed for the devices 20 connected to the PCMCIA bus and the SCSI bus of the computer 8.

The operations implemented by the computer 8 are supported by the modules of the operating system 10, including the enumerators 150, the hardware tree 152, the registry 153, the arbitrators 154, the device drivers 156, the configuration manager 158, and the device configuration database 160, and the computer control system 21. Specifically, the operating system 10 comprises a plurality of computer software programs and at least one program is associated with each of the components 150, 152, 153, 154, 156, 158, and 160. Those persons skilled in the art will understand that the described computer-implemented processes can be coded as computer software programs using known software development techniques.

Enumerators

Figure 9:
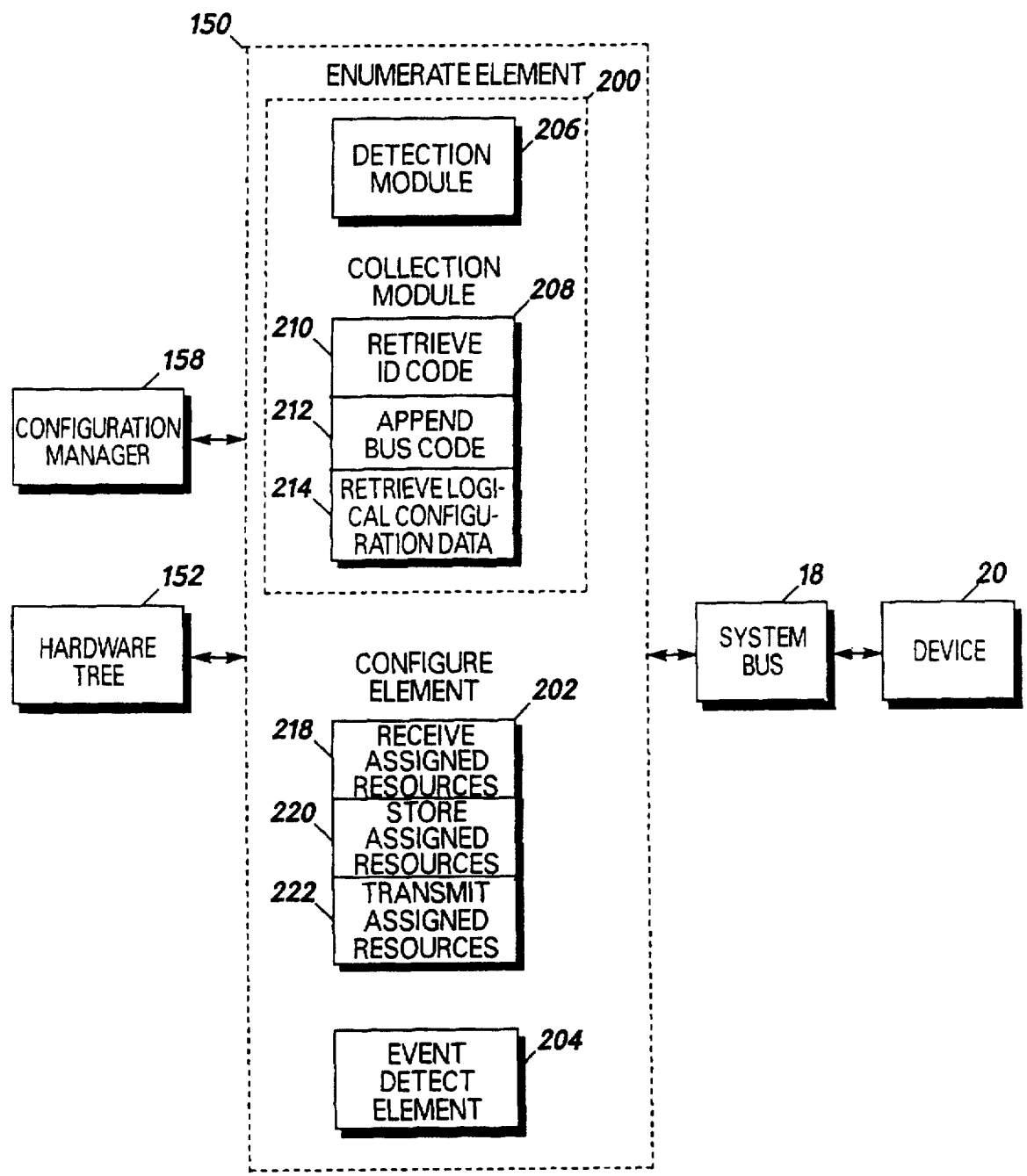
FIG. 9 is a block diagram that illustrates the elements of a component of the preferred embodiment of the present invention, specially an enumerator.

In view of the foregoing, it will be useful to revisit the subject of the enumerators 150 and to review the structure of and the tasks conducted by the enumerators 150, as described below with respect to FIGS. 9–11. Those skilled in the art will appreciate that each standard bus architecture typically requires a unique process for configuring connected devices based upon the characteristics for the system bus. Accordingly, each enumerator 150 is assigned to a corresponding system bus 18 (or the modified BIOS program of the computer control system 21) and operates to support device configuration tasks in view of the characteristics of its assigned component. Although the operations of the enumerator 150 have been described in general terms, the actual implementation of those operations by each enumerator 150 is specific to the architecture for its assigned component. Thus, the enumerators 150 facilitate the development of an operating system that is independent of the characteristics of computer bus architectures because the enumerators 150 support the bus-specific tasks for device configuration.

Enumerator Elements

As required by the characteristics of its assigned system bus 18, each enumerator 150 can conduct up to three separate tasks, specifically enumeration, device configuration, and detection of dynamic events affecting the operating state for the computer 8. To facilitate a review of the operations by the enumerators 150, these functions are shown in FIG. 9 as separate elements, specifically an enumerate element 200, a configure element 202, and an event detect element 204. Referring to FIGS. 1, 6, and 9, the enumerator 150 communicates with its assigned component, such as the system bus 18, and the configuration manager 158 during the operations conducted by the elements 200, 202, and 204. In addition, the enumerator 150 communicates with the hardware tree 152, which is stored in the computer memory 22, to store device information and assigned resource data. As shown in FIG. 9, the enumerator 150 is assigned to one of the system busses 18.

In response to an enumerate instruction from the configuration manager 158, the enumerate element 200 begins to enumerate each of the devices 20 directly connected to its system bus 18. A detection module 206 detects a selected device on the system bus 18. For example, for the ISA bus enumerator, the detection module 206 instructs each device 20 to enter an inactive state and thereafter isolates a particular device 20 from the remaining devices on the system bus 18. A collection module 208 can thereafter obtain the device information from the detected device. In this manner, the detection module 206 and the collection module 208 operate in tandem to enable the enumerate element 200 to collect device information from each of the devices 20 on its assigned system bus.

The collection module 208 can include submodules 210, 212, and 214 to support the acquisition of device information from the devices 20. Specifically, the submodule 210 supports the retrieval of the identification code for the device 20 and the submodule 212 appends to the retrieved identification code the bus code for the assigned system bus 18, thereby forming the device identification code for that device. The submodule 214 supports the retrieval of logical configuration data to complete the acquisition of device information from the particular device 20. An additional submodule (not shown) can support the storage of the device identification code and the logical configuration data within a common device node of the hardware tree 152.

The configure element 202 responds to a data packet containing assigned resources by storing the assigned resource information within the appropriate device nodes of the hardware tree 152. The configure element 202 includes modules 218, 220, and 222 to support this communication of assigned resources between the configuration manager 158, the hardware tree 152, and, as required, the devices 20. Specifically, the module 218 receives the data packet of assigned resources 14 from the configuration manager 158. In response, the module 218 supplies the data packet containing the assigned resources to the modules 220 and 222. The module 222 can supply the assigned resources to the appropriate devices 20 whereas, in contrast, the module 220 stores the assigned resources within the appropriate device nodes of the hardware tree 152.

The event detect element 204 is responsive to the detection of a dynamic event that causes a change in the operating state of the assigned system bus 18. As described in more detail with respect to FIGS. 11A and B, the dynamic events can include connecting another device 20 to the assigned system bus 18 or removing one of the detected devices 20 from the system bus 18. The connection or removal of a device for certain system busses, such as the ISA bus and the PCMCIA bus, is represented by an interrupt signal supplied to the event detect element 204. In contrast, the event of powering the computer 8 is represented by a command signal issued by the configuration manager 158 to the event detect element 204. Accordingly, the event detection operation by the event detect element 204 represents the reception of the interrupt signal or the command signal and the resulting detection signal output in response to the reception of these signals. In response to a detection signal output by the event detect element 204, the configuration manager 158 typically initiates enumeration operations by outputting the enumeration instruction to the enumeration element 200.

The event detect element 204 also responds to commands contained in certain instruction signals from the configuration manager 158. These commands typically instruct the event detect element 204 to conduct specified query-type operations, including deletion of device information stored within a particular device node and to start or to terminate designated tasks.

Identification of Devices Connected to a System Bus

Figure 10:
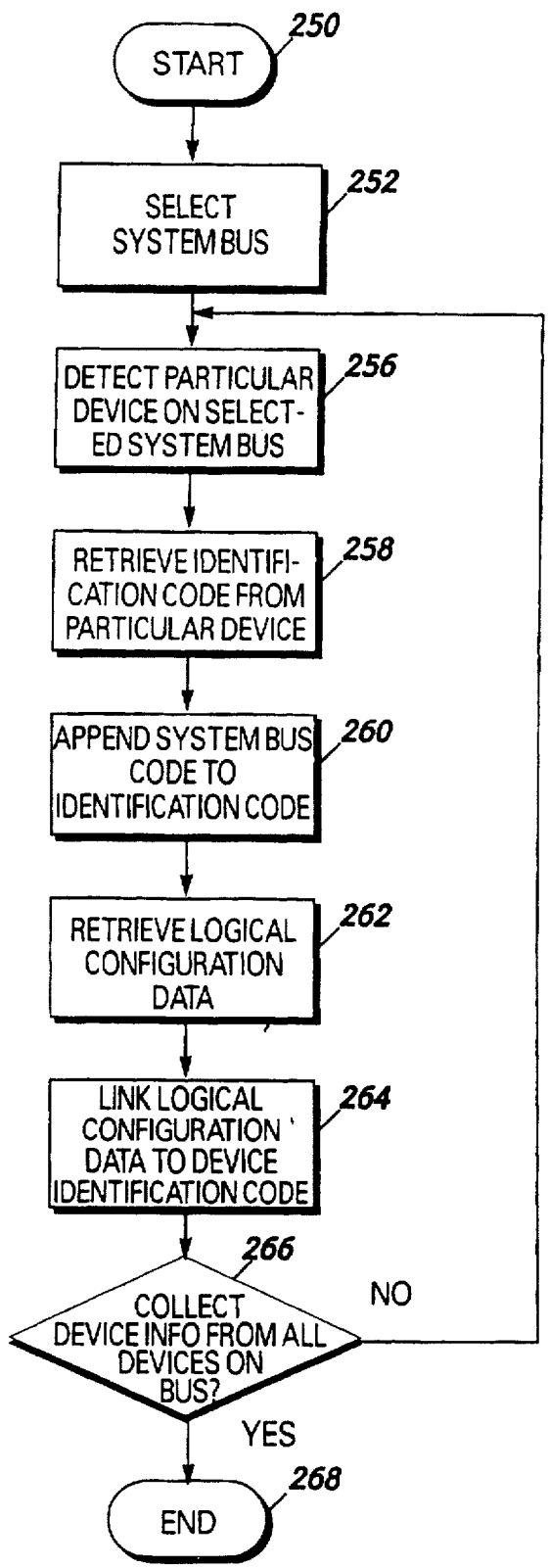
FIG. 10 is a flow chart diagram that illustrates the preferred steps for a method for enumerating devices of a computer system.

FIG. 10 is a flow chart diagram illustrating the preferred steps for the enumeration process that identifies the devices on a system bus of a computer system. Referring to FIGS. 6 and 10, the enumeration process starts at step 250 in response to an event that effects an asynchronous change in the operating state of the computer 8. Specifically, the enumeration process starts in response to powering the computer 8, adding a new device 20 to the computer 8, removing an existing device 20 from the computer 8 or, inserting the computer 8 into or removing the computer 8 from a docking station or expansion unit. In response to any of these events, the enumeration process starts at step 250 and proceeds to step 252 for the selection of a system bus 18. In step 256, a particular device 20 is then detected on the selected system bus 18 to enable the collection of device information.

To acquire the device information, in step 258 an identification code is retrieved from the particular device 20. In step 260, the system bus code, which is associated with the enumerator 150 assigned to the selected system bus 18, is appended to the retrieved identification code. This combination of the identification code and the system bus code forms the device identification code.

In similar fashion, the logical configuration data is retrieved from the particular device 20 during the step 262. Both resource requirement information and resource dependency information are accessed in the step 262. This completes the collection of device information from the particular device 20. To associate or link the logical configuration data with the particular device 20, the logical configuration data is added to the device identification code in the step 264. This completes the process of collecting device information for the particular device 20.

To acquire device information from the remaining devices 20, it is necessary for the enumeration process to continue. In step 266, an inquiry is conducted to determine if device information has been collected from the remaining devices 20 on the selected bus 18. If the response to this inquiry is negative, then the "NO" branch is followed to the step 256 and the collection process continues. However, if the answer is positive, then the "YES" branch is followed to the step 268 and the enumeration process for the selected system bus 18 is concluded.

For the selected system bus 18, it will be understood that the enumerator 150 assigned to this bus operates to detect each of the directly connected devices 20 and stores the collected device information within device nodes in the hardware tree 152. The enumerators 150 assigned to the remaining system busses 18 conduct similar data collection operations to complete the data entries in the hardware tree 152. In this manner, device nodes for the detected devices are constructed and stored in the hardware tree 152. As a result of this enumeration process, each device node in the hardware tree 152 contains at least (1) the combination of the system bus code and the identification code and (2) the logical configuration data for the corresponding devices.

During the enumeration process, certain information, including the device identification code and the logical configuration data, are obtained for the devices 20 of the computer 8. As previously described, the device identification code includes an identification code that uniquely identifies the associated device 20 and the logical configuration data preferably includes both resource requirement and resource dependency information. For example, for ISA-compatible devices, the identification code, also described as a serial identifier, is retrieved from the device by reading the serial data in a bit-wise manner. It will be useful to review the representative device related information for devices compatible with the widely used ISA bus architecture. Nevertheless, it will be appreciated that the data structures for the identification code and logical configuration data associated with devices compatible with other bus architectures can be different from the data structures for ISA-compatible devices. Accordingly, the data structures for the device-related information may be defined by the corresponding bus architecture. In view of the foregoing, Table 2 shows the preferred data structure for an identification code of an ISA-compatible device.

TABLE 2

| Field Name | Length | Definition |
| --- | --- | --- |
| Vendor ID Byte 0 | 8 bits | Bit[7] - 0<br>Bits[6:2] - First character in compressed ASCII<br>Bits[1:0] - Second character in compressed ASCII bits[4:3] |
| Vendor ID Byte 1 | 8 bits | Bits[7:5] - Second character in compressed ASCII bits[2:0]<br>Bits[4:0] - Third character in compressed ASCII |
| Vendor ID Byte 2 | 8 bits | Product Number (Vendor Assigned) |

TABLE 2-continued

| Field Name | Length | Definition |
| --- | --- | --- |
| Vendor ID Byte 3 | 8 bits | Product Number (Vendor Assigned) |
| Serial/Unique Number Byte 0 | 8 bits | Unique device number so the system can differentiate between multiple cards of the same type in one system. Bits[07:00] |
| Serial Number Byte 1 | 8 bits | Serial Number Bits[15:08] |
| Serial Number Byte 2 | 8 bits | Serial Number Bits[23:16] |
| Serial Number Byte 3 | 8 bits | Serial Number Bits[31:24] |
| Checksum | 8 bits | Checksum of ID and serial number verifies that the information has been correctly read from the device. |

Referring to Table 2 and FIG. 1, the data structure for the identification code preferably includes three separate data fields for data representing a vendor identification number, also described as a Vendor ID, a serial number, and a checksum.

The Vendor ID comprises two 8-bit bytes containing a three character compressed ASCII identification of the vendor or manufacturer and two 8-bit bytes for a manufacturer-specific device code. The first portion of the Vendor ID identifies the vendor or manufacturer for the peripheral device or adapter board. The second portion of the Vendor ID is used by the vendor or manufacturer to identify the particular type of device. For example, the manufacturer may develop and market a variety of peripheral devices and adapter boards. Thus, the second portion allows the manufacturer to distinguish a first device type from a second device type. Similarly, if the peripheral device or adapter board contains more than one of the devices 20, such as a parallel interface and a serial port interface, then the manufacture can use the second portion of the Vendor ID to indicate that the particular model of board contains two separate interfaces or devices. It will be appreciated that the Vendor ID serves as a unique identifier for the associated device.

The serial/unique number is a 32-bit serial number which is useful for differentiating between multiple devices 20 having the same Vendor ID when such devices are connected to the same bus system 18. For this reason, the serial number is preferably used as an instance number during the enumeration process for the ISA-compatible components. Similar to the Vendor ID field, the serial number field comprises four 8-bit length bytes. Collectively, the Vendor ID and the serial number fields supply 64 bits to permit the unique identification of the manufacturer, the board or device type, and the serial number.

The checksum field is used to insure that no conflicts have occurred while reading the identification code from the board containing the device(s) 20. A checksum verification operation is conducted when the serial data is acquired from the device 20 by the computer 8. The use of a checksum is a conventional technique for detecting data transfer errors and will not be described in detail herein.

Continuing with the representative example of the ISA-compatible device, logistical configuration data is retrieved from this device one byte at a time in a sequential fashion. The logical configuration data is preferably read in serial fashion from the device 20 almost immediately after reading the checksum field of the identification code. The data structures for the logical configuration data support both small and large information items to minimize the amount of storage needed on the ISA-compatible component. The small and large information items are distinguished by "tagged" data structures. Tables 3A–B show the preferred data structure and the information for the small information items of an ISA-compatible device.

TABLE 3A

| Offset | Field | | |
| --- | --- | --- | --- |
| | Tag Bit [7] | Tag Bits [6:3] | Tag Bits [2:0] |
| Byte 0 | Type = 0 | Small item name | Length = n bytes |
| Bytes 1 to n | | Actual information | |

TABLE 3B

| Small Item Name | Value |
| --- | --- |
| Version number | 0x1 |
| Logical device ID | 0x2 |
| Compatible device ID | 0x3 |
| IRQ format | 0x4 |
| DMA format | 0x5 |
| Start dependent function | 0x6 |
| End dependent function | 0x7 |
| I/O port descriptor | 0x8 |
| Fixed location I/O port descriptor | 0x9 |
| Reserved | 0xA–0xD |
| Vendor defined | 0xE |
| End tag | 0xF |

Referring to Table 3A, the data structure for the small item data has a size of 2–8 bytes. The first byte defines the type and size for most information and is followed by one or more bytes of actual information. Bit 7 of the first byte is used as the tag identifier to differentiate between a small item or a large item data type. Bits 3–6 define the small item name and bits 0–2 define the variable length of the small item data as "n" bytes. The remaining bytes within the small data type structure define the small data items for the logical configuration data.

Referring now to Table 3B and FIG. 1, the small information items are defined for the ISA-compatible devices. Specifically, the small information items can include a version number, a logical device ID, a compatible device ID, an IRQ format, a DMA format, a start dependent function, an end dependent function, a I/O port descriptor, a fixed location I/O port descriptor, a vendor-defined field, and an end tag. These data items describe the resource configuration information for the associated peripheral device or adapter board.

The version number identifies the version of the configuration specification with which the associated board or device is compatible. The version number includes a vendor-specific version number and information about optional commands supported by the device.

The logical device ID field comprises a 32-bit identifier for the associated device 20. It will be understood that certain interface boards or peripheral devices may contain more than one function, such as controlling both video and disk functions. Thus, each function is identified as a logical device 20 that is associated with separate logical configuration data. This identifier also supports the selection of a device driver for the device 20. The field also includes a bit that can be set if the device 20 should be activated by the computer control system 21 when the computer 8 is booted.

The compatible device ID field provides the identification codes of other devices with which the associated device 20 is compatible. As previously described with respect to FIG. 4, the operating system 10 uses the compatible device ID code to support the loading of a compatible device driver if the primary device driver for the associated device is not available. It will be appreciated that there can be several compatible device IDs for each logical device. The order of these device IDs within the compatible device ID field may be used as a criteria for determining which of the compatible device drivers should be searched for and loaded first.

The IRQ data field defines that the associated device uses an interrupt level and supplies a mask with certain bits set to indicate the levels implemented by the device. It will be appreciated that there are 16 possible interrupt levels for an ISA-compatible device.

The DMA data field indicates that the associated device uses a DMA channel and supplies a mask with certain bits set to indicate the channels actually implemented for the device.

The start and end dependent function fields express the interdependencies of the set of resources required by the associated device. The arbitrators 154 use the defined interdependencies to make resource allocation decisions for the logical device.

The I/O port descriptor field includes a full function descriptor for programmable ISA-compatible cards whereas, in contrast, the fixed location I/O port descriptor field supplies a minimal descriptor for existing ISA-compatible devices with fixed I/O requirements.

The Vendor defined field is an optional resource that may be defined for vendor-specific use.

The end tag identifies the conclusion of the resource data and includes a checksum covering all resource data presented after the serial identifier.

For the logical configuration data, Tables 4A–B show the preferred data structure and the information for the large information items of an ISA-compatible device.

TABLE 4A

| Offset | Field Name |
|---|---|
| Byte 0 | Value = 1 xxxxxxxB (Type = 1, Large item name = xxxxxxx) |
| Byte 1 | Length of data items bits [7:0] |
| Byte 2 | Length of data items bits [15:8] |
| Bytes 3 to n | Actual data items |

TABLE 4B

| Large Item Name | Value |
|---|---|
| Memory range descriptor | 0x1 |
| Identifier string (ANSI) | 0x2 |
| Identifier string (Unicode) | 0x3 |
| Vendor defined | 0x4 |
| Reserved | 0x5–0x7F |

Turning now to Table 4A, the large configuration data type structure permits larger amounts of data to be included within the configuration data. Bit 7 of the first byte is set to one to differentiate the large item information from small item information. Bytes 1 and 2 define a 16-bit length field for data items, thereby enabling up to 64 kilobytes of actual data items. Bytes 3 through n include actual large item data, including fields for a memory range descriptor, an identifier string (ANSI), an identifier string (Unicode), and Vendor-defined data, as shown in Table 4B.

Referring to Table 4B and FIG. 1, the memory range descriptor field contains additional information about the characteristics of the memory on the device 20, such as memory control parameters, decode parameters, cache support, and write status. The memory range descriptor field further finds the minimum and maximum ranges for the base memory addresses, the base alignment bits, and the memory range length.

The ANSI identifier string field defines an 8-bit ANSI data string and the Unicode identifier string field defines a Unicode data string. The Vendor-defined data field is an optional data field for vendor use.

Detection of Dynamic Events

Figure 11A:
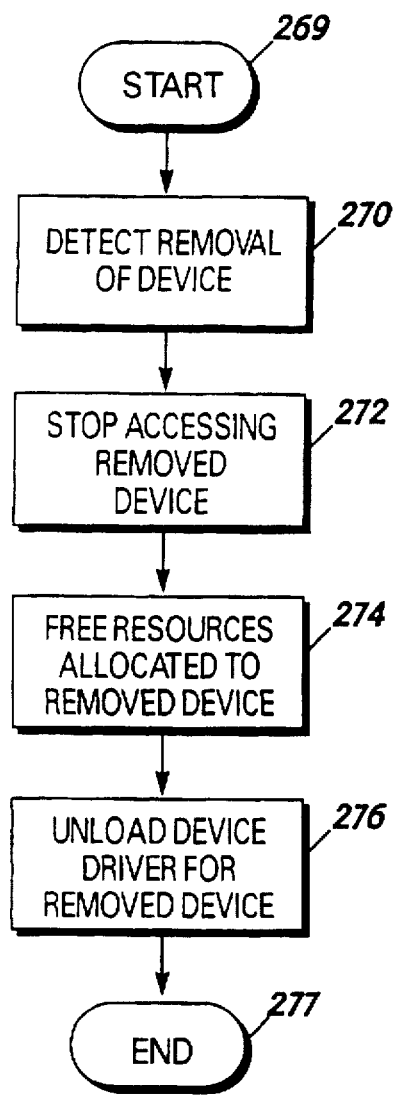
FIGS. 11A and 11B are flow chart diagrams that illustrate the preferred steps or responding to dynamic events that affect the operating state of a computer system.
Figure 11B:
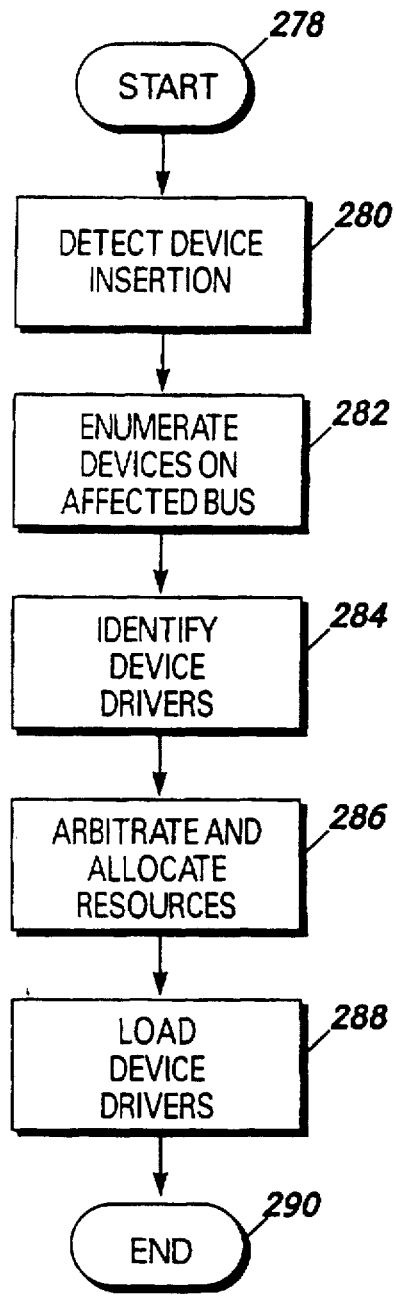

FIGS. 11A and 11B are logic flow charts illustrating tasks conducted by the configuration system in response to certain events affecting the operating state of a computer system. FIG. 11A shows the configuration steps completed in response to the removal of an installed device from a system bus 18. In contrast, FIG. 11B shows the configuration steps taken in response to detection of the insertion of a new device on a system bus 18.

Referring now to FIGS. 6 and 11A, the process starts at step 269 in response to the enumerator 150 receiving an interrupt signal indicating the removal of one of the devices 20 on its assigned system bus 18. The enumerator 150 responds to detection of the device removal by reporting this dynamic event to the configuration manager 158 in step 270. The configuration manager 158 subsequently instructs the device driver 156 for this device in step 272 to terminate access for the removed device. In step 274, the configuration manager 158 instructs the arbitrators 154 to free the resource elements assigned to the removed device. In this manner, the resource elements previously assigned for use by the removed device become available for use by other devices 20 of the computer 8 as required by future configuration operations. In step 276, the configuration manager 158 unloads the device driver 156 corresponding to the removed device and this device driver 156 becomes available for use by other compatible devices. The process ends at step 277.

Turning now to FIGS. 6 and 11B, the process starts at step 278 and the enumerator 150 detects the connection of a new device to its assigned system bus 18 in step 280. The detection of this event is reported to the configuration manager 158 and, in response, the configuration manager 158 instructs the reporting enumerator 150 to enumerate the devices 20 on this affected system bus 18. In step 282, this enumerator 150 responds to the enumerate instruction by collecting device information from each of the devices 20 on the affected system bus 18. For the newly installed device, a device node corresponding to this device 20 is added to the hardware tree 152. In addition, if the new device represents a component which has not been previously installed with the computer 8, this new device information is stored in the registry 153.

Upon completion of the enumeration task, appropriate device drivers 156 are identified for use with the detected devices in step 284. The elements for the resources 14 are subsequently allocated in step 286 and the identified device drivers 156 are loaded in step 288. The process concludes at step 290. Thus, it will be appreciated that the above-described process enables the installation of a new device within the computer 8 without substantial intervention by the user.

In general, the enumerator 150 detects the insertion into or the removal of a device 20 from a socket or post of its assigned system bus 18 by either receiving an interrupt signal generated by the computer 8 or by polling the system bus 18 on a systematic basis to determine the connected devices 20. For the ISA, PCMCIA, and certain docking busses, the associated enumerator receives an interrupt signal that signifies a change of device connections for the affected system bus 18. In contrast, for the SCSI bus and certain infrared link bus structures, it is necessary for the enumerator 150 to poll the associated system bus to determine whether a new device has been installed or an existing device removed from the polled bus.

Arbitrators

Arbitrator Elements

Figure 12:
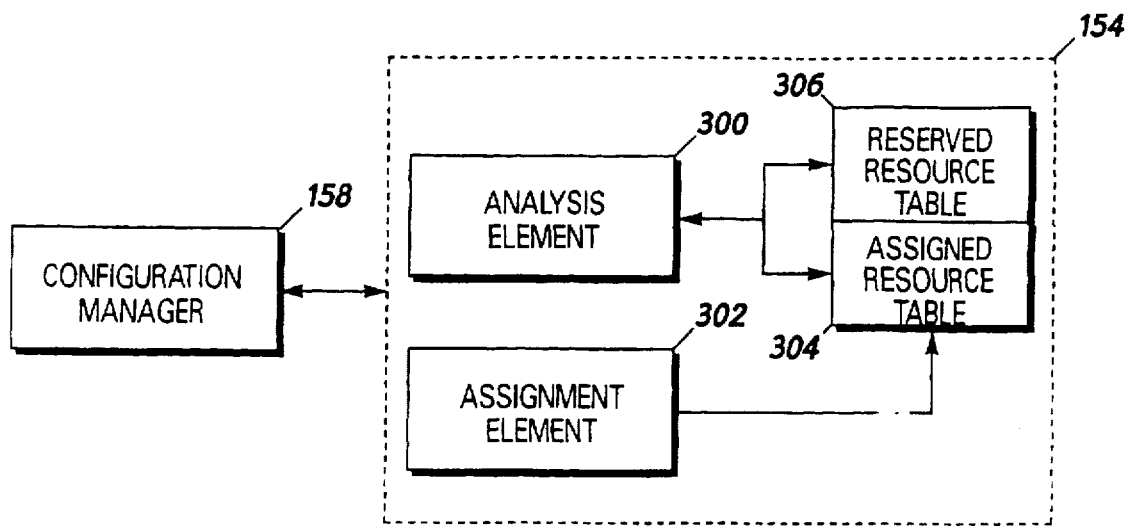
FIG. 12 is a block diagram that illustrates the elements of a component of the preferred embodiment of the present invention, specifically an arbitrator.
Figure 13:
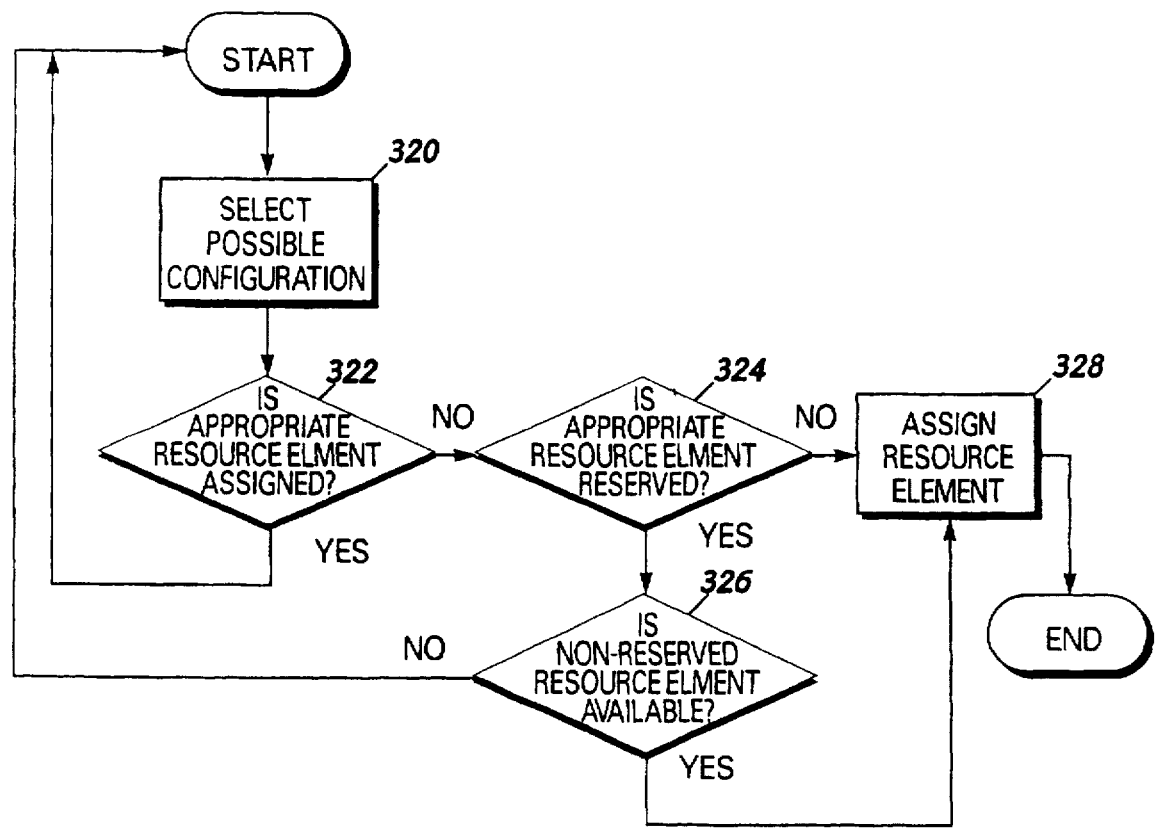
FIG. 13 is a flow chart diagram that illustrates the preferred steps for a method for assigning a resource for conflict-free use by a device of a computer.

Turning now to a more detailed review of the tasks conducted by the arbitrators 154, FIGS. 12 and 13 respectively show the elements for a selected arbitrator 154 and the preferred steps for the arbitration process. Referring now to FIGS. 6 and 12, each arbitrator 154 is responsible for one of the resources 14 of the computer 8 and communicates with the configuration manager 158 via a bidirectional communications link to assign the elements of its particular resource 14.

During device configuration, the configuration manager 158 develops a possible working configuration based upon the device information for the devices 20 connected to the computer 8. For each resource 14, this possible configuration defines resource elements that have been defined as being necessary for operating the devices 20 with the computer system 8.

For some of the devices 20, this possible configuration defines specific resource elements and, for others, the configuration describes general resource requirements. For example, if the arbitrator 154 is responsible for interrupts, a possible configuration for a modem defines specific interrupt elements, namely IRQ2 and IRQ3, whereas the configuration for another peripheral device may define a more general requirement for one of the set of interrupts supplied by the interrupt resource. Because the resource requirements for many of the devices 20 are general in nature, the configuration manager 158 often can supply alternative possible configurations as required to support the resource assignment activities of the arbitrator 154. Possible configurations are device dependent because they are developed by the configuration manager 158 in response to the resource requirements and resource dependencies for the identified devices of the computer 8. Thus, it will be appreciated that these possible configurations can be ordered by priority based upon the ranges for the specified resource requirements and the specific combinations of required resource elements.

The configuration manager 158 supplies a possible configuration to the selected arbitrator 154 to initiate the allocation of resource elements for a selected device. This possible configuration can be represented as an Assign-type instruction that defines the quantity and the range of resource elements for the designated device. For example, a typical instruction for the interrupt arbitrator is Assign (single IRQ, range=1–3, 5, and 9), which directs the assignment for a single interrupt within the range of a set of possible interrupts 1–3, 5, and 9. Another representative instruction for the memory arbitrator is Assign (start=2000 h, end=6000 h, size=32K, alignment=1), which directs the allocation of a 32 k block of memory in the range of 2000 h to 6000 h.

To support the resource assignment tasks, each arbitrator 154 includes an analysis element 300 and an assignment element 302. In response to a possible configuration from the configuration manager 158, the analysis element 300 conducts an examination of the resource elements required by the designated device 20 to determine whether appropriate resource elements are available for use by that device. This analysis process is completed for each device 20 until the analysis element 300 locates appropriate resource elements for that device. However, in the event that the analysis element 300 determines that appropriate resource elements are not available for a selected device 20, then the analysis element 300 outputs an error flag to the configuration manager 158. In response, the configuration manager 158 supplies an alternative possible configuration to the analysis element 300 to support the allocation of the required resource elements for that device 20. This iterative analysis process will continue until resource elements are located by the analysis element 300 for each of the devices 20.

Upon identifying available resource elements, the arbitrator 154 supplies this resource element information to the assignment element 302. In response, the assignment element 302 assigns each resource element for use by the associated devices 20.

Each arbitrator 154 also maintains a table 304 defining assigned resource elements and a table 306 defining reserved resource elements. Upon the assignment of a resource element for a particular device 20, the assignment element 302 adds the assigned resource element as an entry to the assignment table. Thus, the assigned resource table 304 represents a list of the present resource element assignments for the installed devices 20 and each assigned resource element is matched to a corresponding device 20. These assignment entries are modified in response to the removal of an existing device or the insertion of a new device 20 for the computer 8. In addition, the assigned resource table 304 is rebuilt with new entries in response to powering the computer 8.

The reserved resource elements defined in the reserved resource table 306 represent resource elements that are reserved for assignment to certain known devices 20 that require selected resource elements. It is well known that certain devices 20 are designed to use particular elements of one or more of the resources 14. For example, a modem typically requires the use of the interrupts IRQ2 and IRQ3 and many printers are typically designed to use the interrupt IRQ7. Thus, it can be anticipated that certain devices 20 will require access to particular resource elements. Accordingly, for such known devices 20, particular resource elements are held in reserve for use if such devices are actually installed for use with the computer system 8. The reserved resource table 306 contains the listing of such devices and their corresponding required resource elements. The initial entries for the reserved resource table 306 are preferably constructed and stored prior to the delivery of the operating system 10 to the end user.

The analysis element 300 preferably accesses the tables 304 and 306 during the determination of whether a particular resource element is available for use by one of the installed devices 20. This enables the analysis element 300 to determine whether a particular element of the resource 14 has been assigned or reserved for use by another device 20. For reserved elements defined in the reserved resource table 306, the analysis element 300 will generally assign those elements for use by only those devices 20 designated as rigidly requiring a specific resource element. Nevertheless, if the analysis element 300 has no other resource option, it may decide to assign a reserved element to a selected device 20 that is not designated as requiring a reserved resource.

The assigned resource table 304 can be stored within volatile memory because resource element assignments may change each time the computer 8 is powered. In contrast, the reserved resource table 306 is preferably stored within nonvolatile memory to maintain an archival list of known devices 20 requiring the use of certain resource elements.

The assignment element 302 is also responsible for removing one or more entries from the assigned resource table 304. The assignment element 302 typically deletes a resource element assignment when an installed device 20 has been removed from the computer 8. In response to a "deallocate" instruction by the configuration manager 158, the assignment element deletes the resource assignments in the assigned resource table 304 for the designated device 20. This permits those resource elements to be assigned for use by other devices 20. A representative instruction for the memory arbitrator is the command Free (start=2000 h, end=2200 h), which clears the assignment for the allocated memory extending between 2000 h and 2200 h.

The steps for the arbitration process for a selected arbitrator 154 and its associated resource 14 are shown in FIG. 13. Referring now to FIGS. 6, 12, and 13, the arbitration process is started in step 320 in response to the analysis element 300 receiving a possible configuration from the configuration manager 158. In step 322, an inquiry is conducted by the analysis element 300 to determine for a selected device 20 whether a particular appropriate resource element has been assigned for use by another device 20. The analysis element 300 checks the resource assignments stored in the assigned resource table 304 to complete this inquiry. If the particular resource element is represented by an entry in the assigned resource table 304, then the "YES" branch is followed to the step 320 and the analysis process is initiated again based upon another possible configuration. In contrast, if the particular resource element has not been assigned, then the "NO" branch is followed from the step 322 to step 324.

In step 324, an inquiry is conducted to determine if the particular resource element has been reserved for use by another device 20. The analysis element 300 checks the reserved resource elements stored in the reserved resource table 306 to complete this inquiry. If the particular resource element is not reserved, then the "NO" branch is followed to step 328 and this element is assigned by the assignment element 302 for use by the selected device 20. This resource element assignment is stored in the assigned resource table 304 and supplied to the configuration manager 158. Upon assigning the appropriate resource element for the selected device 20, the arbitration process can then be started again for yet another device 20 based upon a new possible configuration for that device. This new possible configuration is supplied to the analysis element 300 by the configuration manager 158. However, in the event that the particular resource element has been reserved, then the "YES" branch is followed from step 324 to step 326.

The analysis process continues through step 326 by conducting an inquiry whether another appropriate resource element is available and is not reserved for use by another device 20. If so, the "YES" branch is followed from step 326 to step 328 and this element is assigned for use by the selected device 20. In contrast, if the response to this inquiry is negative, the "NO" branch is followed to the step 320 and another possible configuration is obtained from the configuration manager 158.

For the preferred configuration system, each arbitrator 154 is assigned to one of the resources 14 for the computer 8. As previously described, the resources 14 for a conventional personal computer include addresses for the memory 22, interrupts 24, DMA channels 26, and I/O ports 28. Nevertheless, it will be appreciated that the resources 14 also can represent any type of resource having a finite quantity of resource elements which can be assigned for use by multiple consumers.

For example, power consumption represents another type of resource because the power supply for a conventional personal computer is capable of supplying a finite amount of electrical power for use by the components of that computer. Thus, power consumption can be divided among multiple power consumers, specifically the active components of the computer system. It will therefore be appreciated that an arbitrator 154 can be developed and used for the allocation and assignment of electrical power to the components of a computer system to conserve power consumption.

Other examples of resources 14 include SCSI identification codes, device identification codes, and logical drive designations. Similar to the example for the power consumption arbitrator, it will be appreciated that the resource allocation concept of the arbitrators 154 can be extended to these type of resources.

Although the preferred environment for the present invention is a personal computer system, it will be appreciated that the invention is also applicable to other types of data processing systems having resources that support the processing operations of the data processing system. Indeed, those skilled in the art will recognize that the principles of the present invention can be extended to other computer architectures and operating systems and are not limited to standard computer architectures or the preferred operating system described herein. Specifically, the inventors envision that the present invention is extendible to present and future bus architectures and device types.

In view of the foregoing, it will be understood that the present invention provides a system for automatically configuring devices for operation with a computer system. For devices that are capable of identifying themselves and declaring their services and resource requirements, the configuration system supports installation and configuration of such devices without user intervention. Devices of the computer system are configured by identifying the devices, determining the resource usage of those devices, detecting and resolving potential conflicting uses of the resources, and allocating the resources for use by the devices.

Device information is collected from the presently installed devices and stored within computer memory. This device information identifies the installed devices and supplies the resource requirements, or those devices. Furthermore, the computer memory can maintain the assigned resource elements for the identified devices of the computer system. Accordingly, the present invention supplies a database containing the device identities, resource requirements, and assigned resource elements for each of the devices installed within the computer system.

It will be appreciated that this database can be accessed by the user to support a review of the present device configuration for the user's computer system. Likewise, this device information can be remotely accessed if the computer system is connected to a computer network or to a modem. Thus, the present invention also supports configuration management for a family of computers by enabling a central party to access and review the device configuration information for each of the computers within that family.

While there has been shown and described the preferred embodiment of the invention, it will be evident to those skilled in the art that various modifications and changes may be made thereto without departing from the spirit and the scope of the invention as set forth in the appended claims and equivalents thereof.

We claim:

1. In a computer system characterized by computer system resources, a method for identifying devices connected to a system bus of said computer system, comprising the steps of:
   a. instructing each of said devices to enter an inactive state, said devices having a function that is disabled during said inactive state;
   b. isolating said particular device from said remaining devices by denying said particular device access to said remaining devices via said system bus;
   c. assigning a device identification code to said particular device, wherein said device identification code uniquely identifies said particular device connected to said system bus;
   d. obtaining logical configuration data for said particular device, wherein said logical configuration data supplies configuration requirements for operating said particular device with said computer system;
   e. repeating steps (a) through (d) for each of the remaining ones of said devices connected to said system bus.

2. In a computer system characterized by system resources, a method for identifying devices connected to one of a plurality of system busses of said computer system, comprising the steps of:
   a. selecting one of said system busses;
   b. instructing each of said devices to enter an inactive state, each of said devices having a function that is disabled during said inactive state;
   c. isolating said particular device from said remaining devices by denying said particular device access to said remaining devices via said selected system bus;
   d. retrieving an identification code from a memory storage device associated with said particular device, wherein said identification code uniquely identifies said particular device;
   e. appending to said identification code a system bus code to form a device identification code associated with said particular device, wherein said system bus code uniquely identifies said selected system bus;
   f. obtaining logical configuration data from said memory storage device wherein said logical configuration data supplies configuration requirements for operating said particular device with said computer system; and
   g. repeating steps (b) through (f) for each of the remaining ones of said devices connected to said selected system bus.

3. A computer-readable medium on which is stored a program module for identifying devices connected to a system bus of a computer system characterized by computer system resources, the program module comprising instructions that, when executed by the programmed computer system, performs the steps of:
   a. instructing each of the devices to enter an inactive state, the devices having a function that is disabled during the inactive state;
   b. isolating the particular device from the remaining devices by denying the particular device access to the remaining devices via the system bus;
   c. assigning a device identification code to the particular device, wherein the device identification code uniquely identifies the particular device connected to the system bus;
   d. obtaining logical configuration data for the particular device, wherein the logical configuration data supplies configuration requirements for operating the particular device of the computer system;
   e. repeating steps (a) through (d) for each of the remaining ones of the devices connected to the system bus.

4. In a computer system characterized by computer system resources, a method for identifying devices connected to a plurality of system busses of said computer system, comprising the steps of:
   (a) selecting one of said plurality of system busses as a selected system bus;
   (b) detecting a particular one of said devices connected to said selected system bus;
   (c) assigning a device identification code to said particular device, wherein said device identification code uniquely identifies said particular device connected to said selected system bus;
   (d) obtaining logical configuration data for said particular device, wherein said logical configuration data supplies configuration requirements for operating said particular device with said computer system;
   (e) repeating steps (b)–(d) for each of the remaining ones of said devices connected to said selected system bus; and
   (f) repeating steps (a)–(e) for each of the remaining ones of said plurality of system busses.

5. A system for supporting the operations of devices connected to a plurality of system buses of a computer system, said system comprising:
   means for detecting dynamic events effecting an asynchronous change in the operating state of said computer system;
   means for iteratively selecting each of the system buses;
   means for enumerating each of said devices connected to each of the system buses in response to detecting one of said dynamic events; and
   means for configuring each of said devices connected to each of the system buses in response to an allocation of resources of said computer system for use by said devices.

6. A system for supporting the operations of devices connected to a plurality of system busses of a computer system, the system comprising:
   a detector for detecting dynamic events effecting an asynchronous change in the operating state of the computer system;
   an enumerator for each of the system busses for enumerating each of the devices connected to each of the system busses in response to detection of one of the dynamic events; and
   a configuration manager for managing configuration of each of the devices in response to an arbitrated assignment of resources of the computer system for use by the devices.

7. A computer-readable medium on which is stored a program module for identifying devices connected to a plurality of system buses of a computer system characterized by computer system resources, the program module comprising instructions that, when executed by the programmed computer system, performs the steps of:
   (a) selecting one of the plurality of system buses as a selected system bus;
   (b) detecting a particular one of the devices connected to the selected system bus;
   (c) assigning a device identification code to the particular device, by retrieving an identification code from the particular device, the identification code including a string of characters which uniquely define the particular device; and appending a system bus code to the identification code to form the device identification code, wherein the system bus code uniquely identifies the selected system bus;

(d) obtaining logical configuration data for the particular device, wherein the logical configuration data supplies configuration requirements for operating the particular device with the computer system;

(e) repeating steps (b)–(d) for each of the remaining ones of the devices connected to the selected system bus.

8. In a computer system characterized by system resources, a method for identifying devices connected to a plurality of system busses of said computer system, comprising the steps of:

(a) selecting one of said system busses as a selected system bus;

(b) detecting a particular one of said devices connected to said selected system bus;

(c) retrieving an identification code from a memory storage device associated with said particular device, wherein said identification code uniquely identifies said particular device;

(d) appending to said identification code a system bus code to form a device identification code associated with said particular device, wherein said system bus code uniquely identifies said selected system bus;

(e) obtaining logical configuration data from said memory storage device, wherein said logical configuration data supplies configuration requirements for operating said particular device with said computer system;

(f) repeating steps (b)–(e) for each of the remaining ones of said devices connected to said selected system bus; and (g) repeating steps (a)–(f) for each of the remaining ones of said plurality of system busses.

9. The method of claim 4, wherein said detecting step comprises the steps of:

instructing each of said devices to enter an inactive state, said devices having a function that is disabled during said inactive state; and isolating said particular device from said remaining devices by denying said particular device access to said remaining devices via said selected system bus.

10. The method of claim 4, wherein said assigning step comprises the steps of:

reading an identification code from a memory storage device associated with said particular device, said identification code including a string of characters which uniquely define said particular device; and appending a system bus code to said identification code to form said device identification code, wherein said system bus code uniquely identifies said selected system bus.

11. The method of claim 10, wherein said assigning step further comprises storing said device identification code within system memory of said computer system.

12. The method of claim 11, wherein said system memory comprises a plurality of hierarchically-arranged device nodes, said device identification code being stored within a selected one of said device nodes.

13. The method of claim 11, wherein said step of obtaining said logical configuration data comprises reading said logical configuration data from said memory storage device.

14. The method of claim 13, wherein said step of obtaining said logical configuration data further comprises storing said logical configuration data within said system memory of said computer system, said logical configuration data associated with said device identification code for said particular device.

15. The method of claim 14, wherein said system memory comprises a plurality of hierarchically-arranged device nodes, said logical configuration data being stored within a selected one of said device nodes.

16. The method of claim 4, wherein said assigning step comprises the steps of:

retrieving an identification code from said particular device, said identification code including a string of characters which uniquely define said particular device; and appending a system bus code to said identification code to form said device identification code, wherein said system bus code uniquely identifies said selected system bus.

17. The method of claim 16, wherein said step of retrieving said identification code comprises reading said identification code from a memory storage device associated with said particular device.

18. The method of claim 16, wherein said assigning step further comprises storing said device identification code within system memory of said computer system.

19. The method of claim 4, wherein said step of obtaining said logical configuration data comprises retrieving said logical configuration data from said particular device.

20. The method of claim 19, wherein said step of retrieving said logical configuration data comprises reading said logical configuration data from a memory storage device associated with said particular device.

21. The method of claim 19, wherein said step of obtaining said logical configuration data further comprises storing said logical configuration data within system memory of said computer system.

22. The method of claim 4, wherein said device identification code comprises an identification code and a system bus code, wherein said identification code includes a string of characters which uniquely define said particular device and said system bus code uniquely identifies said selected system bus.

23. The method of claim 4, wherein said logical configuration data comprises:

resource requirement information and resource dependency information, said resource requirement information defines certain resources of said computer system which are necessary for operation of said particular device with said computer system, at least one of said resources comprising a plurality of resource elements, and said resource dependency information defines a particular combination of said resource elements which are necessary for operation of said particular device with said computer system.

24. The method of claim 4, wherein said detecting step is initiated in response to certain events affecting an asynchronous change in the operating state of said computer system.

25. The method of claim 4, wherein said detecting step is initiated in response to powering said computer system.

26. The method of claim 25, wherein said detecting step is further initiated in response to the connection of another one of devices to said selected system bus.

27. The method of claim 26, wherein said detecting step is further initiated in response to the removal of one of said devices from said selected system bus.

49

28. The method of claim 8, wherein said detecting step comprises the steps of:
   instructing each of said devices to enter an inactive state, each of said devices having a function that is disabled during said inactive state; and
   isolating said particular device from said remaining devices by denying said particular device access to said remaining devices via said selected system bus.

29. The method of claim 8, wherein said detecting step is initiated in response to certain events causing an asynchronous change in the operating state of said computer system.

30. The method of claim 29, wherein said detecting step is initiated in response to powering said computer system.

31. The method of claim 30, wherein said detecting step is further initiated in response to connecting another one of said devices to said selected system bus.

32. The method of claim 31, wherein said detecting step is further initiated in response to removing one of said devices from said selected system bus.

33. The method of claim 8, wherein said appending step further comprises storing said device identification code with system memory of said computer system, said system memory comprising a plurality of hierarchically-arranged nodes, said device identification code being stored within a selected one of said nodes.

34. The method of claim 33, wherein said step of obtaining said logical configuration data further comprises storing said logical configuration data within a selected one of said nodes of said system memory.

35. The method of claim 8, wherein said identification code comprises a character string including ASCII characters to uniquely define said particular device.

36. The method of claim 8, wherein said logical configuration data comprises:
   resource requirement information and resource dependency information,
   said resource requirement information defines certain resources of said computer system which are necessary for operation of said particular device with said computer system, at least one of said resources comprising a plurality of resource elements, and
   said resource dependency information defines a particular combination of said resource elements which are necessary for operation of said particular device with said computer system.

37. The system of claim 5, wherein said dynamic events include at least one of the following; powering said computer system, connecting another one of said devices to one of said system busses, and removing one of said devices from one of said system busses.

38. The system of claim 5, wherein said enumerate means comprises:
   means for detecting a particular one of said devices; and
   means for collecting device information from said particular device, said device information uniquely identifying said particular device and defining usage requirements of said resources for said particular device.

39. The system of claim 38, wherein said collection means comprises:
   means for reading an identification code from a memory storage device associated with said particular device, said identification code including a string of characters which uniquely define said particular device;
   means for appending a system bus code to said identification code to form said device identification code,

50 wherein said system bus code uniquely identifies one of said system busses; and
   means for reading logical configuration data from said memory storage device, wherein said logical configuration data supplies said usage requirements of said computer resources for said particular device.

40. The system of claim 39, wherein said collection means further comprises means for storing said device identification code and said logical configuration data within a system memory of said computer system.

41. The system of claim 40, wherein said system memory comprises a plurality of hierarchically-arranged nodes, said device identification code and said logical configuration data being stored within a selected one of said nodes.

42. The system of claim 5, wherein said configuring means comprises:
   means for receiving said allocation of said resources;
   means for storing said allocation of said resources within a system memory of said computer system; and
   means for instructing said devices of said allocation of said computer resources.

43. The computer-readable medium of claim 7, wherein the detecting step comprises the steps of:
   instructing each of the devices to enter an inactive state, the devices having a function that is disabled during the inactive state; and
   isolating the particular device from the remaining devices by denying the particular device access to the remaining devices via the selected system bus.

44. The computer-readable medium of claim 7, wherein the assigning step comprises the steps of:
   reading an identification code from a memory storage device associated with the particular device, the identification code including a string of characters which uniquely define the particular device; and
   appending a system bus code to the identification code to form the device identification code, wherein the system bus code uniquely identifies the selected system bus.

45. The computer-readable medium of claim 44, wherein the assigning step further comprises storing the device identification code within system memory of the computer system.

46. The computer-readable medium of claim 45, wherein the system memory comprises a plurality of hierarchically-arranged device nodes, the device identification code being stored within a selected one of the device nodes.

47. The computer-readable medium of claim 45, wherein the step of obtaining the logical configuration data comprises reading the logical configuration data from the memory storage device.

48. The computer-readable medium of claim 47, wherein the step of obtaining the logical configuration data further comprises storing the logical configuration data within the system memory of the computer system, the logical configuration data associated with the device identification code for the particular device.

49. The computer-readable medium of claim 48, wherein the system memory comprises a plurality of hierarchically-arranged device nodes, the logical configuration data being stored within a selected one of the device nodes.

50. The computer-readable medium of claim 7, wherein the step of retrieving the identification code comprises reading the identification code from a memory storage device associated with the particular device.

51. The computer-readable medium of claim 7, wherein the step of obtaining the logical configuration data comprises retrieving the logical configuration data from the particular device.

52. The computer-readable medium of claim 7, wherein the device identification code comprises an identification code and a system bus code, wherein the identification code includes a string of characters which uniquely define the particular device and the system bus code uniquely identifies the selected system bus.

53. The computer-readable medium of claim 7, wherein the logical configuration data comprises:

resource requirement information and resource dependency information, the resource requirement information defines certain resources of the computer system which are necessary for operation of the particular device with the computer systems at least one of the resources comprising a plurality of resource elements, and the resource dependency information defines a particular combination of the resource elements which are necessary for operation of the particular device with the computer system.

54. The computer-readable medium of claim 7, wherein the detecting step is initiated in response to certain events affecting an asynchronous change in the operating state of the computer system.

55. The method of claim 1, wherein said assigning step comprises the steps of:

reading an identification code from a memory storage device associated with said particular device, said identification code including a string of characters which uniquely define said particular device; and appending a system bus code to said identification code to form said device identification code, wherein said system bus code uniquely identifies said system bus.

56. The method of claim 55, wherein said assigning step further comprises storing said device identification code within system memory of said computer system.

57. The method of claim 56, wherein said system memory comprises a plurality of hierarchically-arranged device nodes, said device identification code being stored within a selected one of said device nodes.

58. The method of claim 56, wherein said step of obtaining said logical configuration data comprises reading said logical configuration data from said memory storage device.

59. The method of claim 58, wherein said step of obtaining said logical configuration data further comprises storing said logical configuration data within said system memory of said computer system, said logical configuration data associated with said device identification code for said particular device.

60. The method of claim 59, wherein said system memory comprises a plurality of hierarchically-arranged device nodes, said logical configuration data being stored within a selected one of said device nodes.

61. The method of claim 1, wherein said assigning step comprises the steps of:

retrieving an identification code from said particular device, said identification code including a string of characters which uniquely define said particular device; and appending a system bus code to said identification code to form said device identification code, wherein said system bus code uniquely identifies said system bus.

62. The method of claim 61, wherein said step of retrieving said identification code comprises reading said identification code from a memory storage device associated with said particular device.

63. The method of claim 61, wherein said assigning step further comprises storing said device identification code within system memory of said computer system.

64. The method of claim 1, wherein said step of obtaining said logical configuration data comprises retrieving said logical configuration data from said particular device.

65. The method of claim 64, wherein said step of retrieving said logical configuration data comprises reading said logical configuration data from a memory storage device associated with said particular device.

66. The method of claim 64, wherein said step of obtaining said logical configuration data further comprises storing said logical configuration data within system memory of said computer system.

67. The method of claim 1, wherein said device identification code comprises an identification code and a system bus code, wherein said identification code includes a string of characters which uniquely define said particular device and said system bus code uniquely identifies said system bus.

68. The method of claim 1, wherein said logical configuration data comprises:

resource requirement information and resource dependency information, said resource requirement information defines certain resources of said computer system which are necessary for operation of said particular device with said computer system, at least one of said resources comprising a plurality of resource elements, and said resource dependency information defines a particular combination of said resource elements which are necessary for operation of said particular device with said computer system.

69. The method of claim 1, wherein said instructing step is initiated in response to certain events affecting an asynchronous change in the operating state of said computer system.

70. The method of claim 1, wherein said instructing step is initiated in response to powering said computer system.

71. The method of claim 70, wherein said instructing step is further initiated in response to the connection of another one of devices to said system bus.

72. The method of claim 71, wherein said instructing step is further initiated in response to the removal of one of said devices from said system bus.

73. The method of claim 2, wherein said instructing step is initiated in response to certain events causing an asynchronous change in the operating state of said computer system.

74. The method of claim 73, wherein said instructing step is initiated in response to powering said computer system.

75. The method of claim 74, wherein said instructing step is further initiated in response to connecting another one of said devices to said selected system bus.

76. The method of claim 75, wherein said instructing step is further initiated in response to removing one of said devices from said selected system bus.

77. The method of claim 2, wherein said appending step further comprises storing said device identification code with system memory of said computer system, said system memory comprising a plurality of hierarchically-arranged nodes, said device identification code being stored within a selected one of said nodes.

78. The method of claim 77, wherein said step of obtaining said logical configuration data further comprises storing said logical configuration data within a selected one of said nodes of said system memory.

79. The method of claim 2, wherein said identification code comprises a character string including ASCII characters to uniquely define said particular device.

80. The method of claim 2, wherein said logical configuration data comprises:
   resource requirement information and resource dependency information,
   said resource requirement information defines certain resources of said computer system which are necessary for operation of said particular device with said computer system, at least one of said resources comprising a plurality of resource elements, and
   said resource dependency information defines a particular combination of said resource elements which are necessary for operation of said particular device with said computer system.

81. The computer-readable medium of claim 3, wherein the assigning step comprises the steps of:
   reading an identification code from a memory storage device associated with the particular device, the identification code including a string of characters which uniquely define the particular device; and
   appending a system bus code to the identification code to form the device identification code, wherein the system bus code uniquely identifies the system bus.

82. The computer-readable medium of claim 81, wherein the assigning step further comprises storing the device identification code within system memory of the computer system.

83. The computer-readable medium of claim 82, wherein the system memory comprises a plurality of hierarchically-arranged device nodes, the device identification code being stored within a selected one of the device nodes.

84. The computer-readable medium of claim 82, wherein the step of obtaining the logical configuration data comprises reading the logical configuration data from the memory storage device.

85. The computer-readable medium of claim 84, wherein the step of obtaining the logical configuration data further comprises storing the logical configuration data within the system memory of the computer system, the logical configuration data associated with the device identification code for the particular device.

86. The computer-readable, medium of claim 85, wherein the system memory comprises a plurality of hierarchically-arranged device nodes, the logical configuration data being stored within a selected one of the device nodes.

87. The computer-readable medium of claim 3, wherein the assigning step comprises the steps of:
   retrieving an identification code from the particular device, the identification code including a string of characters which uniquely define the particular device; and
   appending a system bus code to the identification code to form the device identification code, wherein the system bus code uniquely identifies the system bus.

88. The computer-readable medium of claim 87, wherein the step of retrieving the identification code comprises reading the identification code from a memory storage device associated with the particular device.

89. The computer-readable medium of claim 3, wherein the step of obtaining the logical configuration data comprises retrieving the logical configuration data from the particular device.

90. The computer-readable medium of claim 3, wherein the device identification code comprises an identification code and a system bus code, wherein the identification code includes a string of characters which uniquely define the particular device and the system bus code uniquely identifies the system bus.

91. The computer-readable medium of claim 3, wherein the logical configuration data comprises:
   resource requirement information and resource dependency information,
   the resource requirement information defines certain resources of the computer system which are necessary for operation of the particular device with the computer system, at least one of the resources comprising a plurality of resource elements, and
   the resource dependency information defines a particular combination of the resource elements which are necessary for operation of the particular device with the computer system.

92. The computer-readable medium of claim 3, wherein the instructing step is initiated in response to certain events affecting an asynchronous change in the operating state of the computer system.

93. The system of claim 6, wherein said dynamic events include at least one of the following: powering said computer system, connecting another one of said device to said system bus, and removing one of said device from said system bus.

94. The system of claim 6, wherein said enumerator comprises:
   a second detector for detecting a particular one of said devices; and
   a collector for collecting device information from said particular device, said device information uniquely identifying said particular device and defining usage requirements of said resources for said particular device.

95. The system of claim 94, wherein said collector is operative to:
   read an identification code from a memory storage device associated with said particular device, said identification code including a string of characters which uniquely define said particular device;
   append a system bus code to said identification code to form said device identification code, wherein said system bus code uniquely identifies one of said system busses; and
   read logical configuration data from said memory storage device, wherein said logical configuration data supplies said usage requirements of said computer resources for said particular device.

96. The system of claim 95, wherein said collector is further operative to store said device identification code and said logical configuration data within a system memory of said computer system.

97. The, system of claim 96, wherein said system memory comprises a plurality of hierarchically-arranged nodes, said device identification code and said logical configuration data being stored within a selected one of said nodes.

98. The system of claim 6, wherein said configuration manager is operative to:
   receive said allocation of said resources;
   store said allocation of said resources within a system memory of said computer system; and
   instruct said devices of said allocation of said computer resources.

* * * * *